United States Patent [19]
Sales et al.

[11] Patent Number: 5,917,845
[45] Date of Patent: Jun. 29, 1999

[54] DEVICES THAT PRODUCE A SUPER RESOLVED IMAGE FOR USE IN OPTICAL SYSTEMS

[75] Inventors: Tasso R. M. Sales; G. Michael Morris, both of Rochester, N.Y.

[73] Assignee: The University of Rochester, Rochester, N.Y.

[21] Appl. No.: 08/807,543

[22] Filed: Feb. 28, 1997

Related U.S. Application Data

[XX .
[60] Provisional application No. 60/020,258, Jun. 19, 1996.

[51] Int. Cl.⁶ .............................. H01S 3/13; G02B 5/18; G11B 7/00
[52] U.S. Cl. .............................. 372/32; 372/31; 372/102; 372/98; 372/108; 359/566; 359/569; 369/112; 369/116
[58] Field of Search .................... 372/31, 32, 29, 372/25, 23, 9, 12, 43, 50, 69, 70, 98, 101, 108; 385/37; 369/124, 125, 44.37, 44.38, 44.39, 112, 116; 359/566, 569, 573

[56] References Cited

U.S. PATENT DOCUMENTS

| | | | |
|---|---|---|---|
| 5,349,592 | 9/1994 | Ando | 372/32 |
| 5,485,289 | 1/1996 | Curry | 358/448 |
| 5,559,784 | 9/1996 | Ota | 369/124 |
| 5,619,488 | 4/1997 | Ota et al. | 369/112 |
| 5,631,687 | 5/1997 | Tanaka | 347/134 |

OTHER PUBLICATIONS

The use of lenses with annular aperture in scanning optical microscopy, C.J.R. Sheppard, Optik, 48(1977).

High–Efficiency Replicated Diffractive Optics, Rochester Photonics Corporation, SPIE vol. 2600, Dec. '95, pp. 50–55.

Fabrication of continuous–relief micro–optical elements by direct laser writing in photoresists, Optical Engineering/Nov. '94, vol. 33 No. 11.

The Resolving Power of a Coated Objective II, Journal of the Optical Society of America, vol. 40, No. 4, Apr. 1950, pp. 222–224.

Reappraisal of arrays of concentric annuli as superresolving filters, JOSA Letters, vol. 72, No. 9/Sep. '82/J.Opt.Soc.Am., pp. 1287–1291.

Superresolving filters in confocally scanned imaging systems, J. Opt.Soc.Am.A/vol. 3, No. 11/Nov. '86, pp.1892–1896.

*Primary Examiner*—Brian Healy
*Attorney, Agent, or Firm*—M. LuKacher; K. LuKacher

[57] ABSTRACT

Superresolution elements which provide masks and are integrated into superresolution lenses, and in confocal imaging, optical disk and reprographic systems and laser pattern generation systems. The elements are phase-only elements, where the phase transmittance varies across the diameter of the element while the amplitude transmission is kept to one, although the amplitude can be varied to provide more design flexibility. These element filters can be fabricated by means of a variety of techniques including diffractive optics technology, holographic methods, thin film deposition, and as gradient-index elements.

28 Claims, 23 Drawing Sheets

DEVICES THAT PRODUCE A SUPER RESOLVED IMAGE FOR USE IN OPTICAL SYSTEMS

This application claims the priority benefit of our provisional application Ser. No. 60/020,258 filed Jun. 19, 1996.

BACKGROUND OF THE INVENTION

1. Field of the Invention

The present invention relates to optical devices that are capable of generating diffraction patterns with the central spot size smaller than the diffraction limit or superresolution, for application in optical systems that can make use of this effect such as imaging, confocal scanning microscopy, optical data storage, high-resolution laser printing and laser pattern generation. More particularly, the invention is primarily concerned with phase-only elements, where the phase transmittance varies across the diameter of the element while the amplitude transmission is kept to one, although the amplitude can be varied to provide more design flexibility. These element filters can be fabricated by means of a variety of techniques including diffractive optics technology, holographic methods, thin film deposition, and as gradient-index elements.

2. Related Background Art

It is known that well-corrected optical systems are able to focus most of an incident beam of light into a small region called the beam spot surrounded by a series of low-intensity rings or sidelobes. The size of the beam spot is ultimately limited by the effects of diffraction which determines the maximum resolution achievable in some specific circumstance. For several applications, it is of great interest that the size of the central spot be reduced without affecting too much the behavior of the nearby sidelobes. This effect is known as superresolution. Several applications can benefit from superresolution effects. In scanning confocal microscopy, superresolution techniques increase the resolution with which some object is scanned, resulting in images of higher contrast. In optical data storage, a superresolved beam spot can be used to increase the density of information that can be recorded in an optical disk. Also, it can read information encoded in small pits (bits of information) along a track. In laser printing, a superresolution device increase the density of points that can be printed, in comparison to conventional printing systems.

Prior art involves the use of an obscured aperture to produce a superresolved image (C. J. R. Sheppard, Optik 48 (1977) 329). In another technique, the superresolution device is divided in a typically small number of rotationally symmetric annular sections and the radial positions of the annular sections are varied while the phase transmittance alternately varies among the values 0 and $\pi+2\pi q$, where q is an integer number (J. E. Wilkins, J. Opt. Soc. Am. 40 (1950) 222; Z. S. Hegedus and V. Sarafis, J. Opt. Soc. Am. A 3 (1986) 1892; U.S. Pat. No. 5,349,592 issued to Ando on Sep. 20, 1994). Other methods involving continuous variations of the amplitude transmission function of the superresolution device can also be considered but they offer little advantages over an annular device (I. J. Cox, C. J. R. Sheppard, and T. Wilson, J. Opt. Soc. Am., 72 (1982) 1287).

There are several difficulties associated with the methods previously mentioned. In most applications that can employ superresolution devices, the goal is to reduce the spot size of the central core of the diffraction pattern. However, it is well-known that as the spot size is reduced, the maximum intensity of the central core relative to the diffraction limited spot (Strehl ratio) falls very rapidly. Simultaneously, the relative intensity of the subsequent sidelobes to the central core intensity also increases very rapidly. These effects are extremely undesirable. In imaging, the very low Strehl ratio and high sidelobes causes an effective loss of resolution, since the eye will detect primarily the diffraction rings. In optical disk systems, the low Strehl ratio may not possess enough energy for recording and high sidelobes may cause the appearance of undesired pits. Also in readout, the sidelobes must be kept to acceptable levels in order to avoid reading errors. In scanning confocal microscopy, low Strehl ratio is tolerable to a certain point but high sidelobes can reduce dramatically the usable field of view. Printing systems also require a high Strehl ratio to guarantee that a substrate will be sensitized and low sidelobe intensity to prevent spurious marks from being recorded. Specifically referring to the current methods to achieve superresolution, the method of using obscurations or controlling the amplitude transmittance necessarily causes a reduction of central core intensity. The device with a $\pi+2\pi q$ phase shift avoids the absorption of incident light and usually yields small spot sizes but presents strong sidelobe effects. Furthermore the number of available design variables is very limited, being basically restricted to the radial positions of each annular zone. We have found that by properly manipulating the zone boundaries, the phase and amplitude transmission, and the shape of the phase function, it is possible to obtain diffraction patterns of high resolution. The purpose of the present invention is to provide a superresolution mask design that offers a large number of design variables, better or comparable performance than previous methods, high Strehl ratio, proper control of sidelobe effects, and a wide variety of applications.

SUMMARY OF THE INVENTION

In view of the aforementioned disadvantages of present superresolution devices, it is an object of the invention to provide an improved optical element that assumes several distinct forms and produces a diffracted spot of arbitrarily small size and has an increased number of design parameters, that reduces the intensity of the diffraction rings while keeping a high central core intensity.

It is another object of the invention to provide an improved confocal imaging system capable of improving the scanning resolution of a sample object.

It is a further object of the invention to provide an improved optical head device capable of recording information with high resolution in an optical disk as well as reading data with high resolution from an optical disk.

It is another object of the invention to provide an improved printing system capable of delivering data with high resolution.

According to the invention, there is provided an optical system via which a light beam passes and an element to change the phase of the incoming light beam with each portion of the element presenting two possible thicknesses and variable transmittance or may also present any of a plurality of possible thicknesses and transmittance or continuously variable thickness or transmittance.

Also according to the invention, the phase charging element can present two possible changing element indices of refraction and variable transmittance or any of a plurality of possible indices and variable transmission or continuously variable index of refraction and transmittance.

Further, according to the invention, the phase changing element can present any of a plurality of possible thickness and variable transmittance.

Still further according to the invention, there is provided an improved optical system comprising an objective lens capable of focusing to a beam spot smaller than the beam spot produced by a conventional refractive lens.

Still further according to the invention, there is provided an improved confocal scanning device for use in confocal scanning microscopic apparatus comprising means for generating a light beam, means for focusing the light to a point, means for collecting the light and refocusing to a detector; and means to reduce the size of the focused spot.

Still further according to the invention, there is provided an improved optical disk system comprising means for generating a light beam, means for correcting the beam and focusing onto an optical disk, means to modify the beam so that a small beam spot is obtained, and means to detect and process the signal from the optical disk.

Still further according to the invention, there is provided an improved printing system comprising means for generating a light beam, means for converting the beam to a line image, means to modify the beam so that a small beam spot is obtained, and means to focus the beam to a substrate.

DESCRIPTION OF THE PREFERRED EMBODIMENTS

Figure 1:
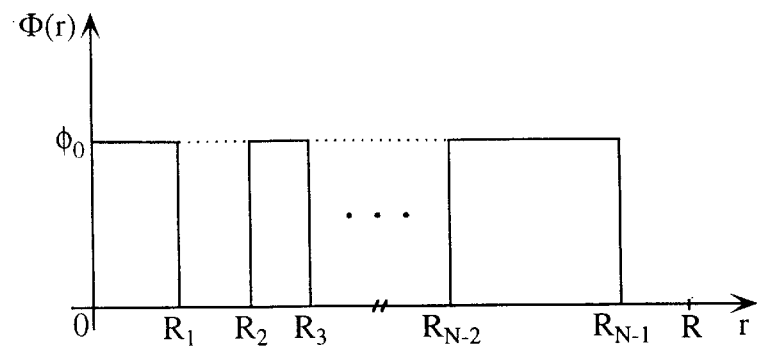
FIG. 1 shows a cross-section of the rotationally symmetric phase transmittance function of a superresolution device in accordance with a first embodiment of the invention.
Figure 1A:
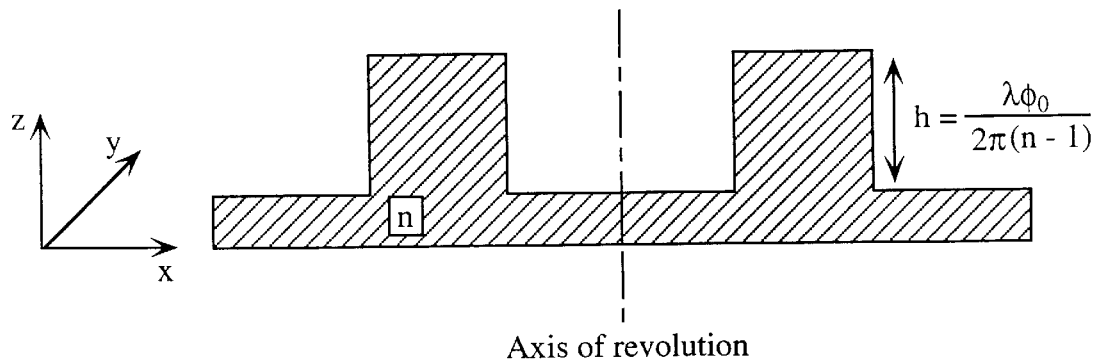
FIG. 1A is a schematic representation of the cross-section of a surface-relief device with a phase function shown in FIG. 1 for a case of two zones.
Figure 1B:
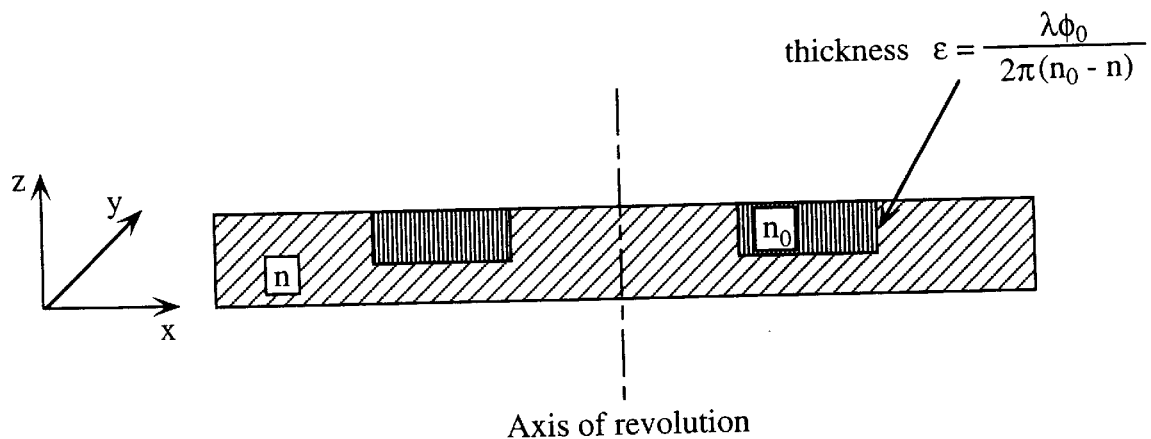
FIG. 1B is a schematic representation of the cross-section of a gradient-index device with a phase function shown in FIG. 1 for a case of two zones.

A first embodiment of the invention in an element, which transmits radiation and especially optical radiation such as light, and has a phase function as shown in FIG. 1. The transmittance t of the optical element is described by a function of the form $t=T(r,\theta)\exp[j\Phi(r,\theta)]$ or $t=T(x,y)\exp[j\Phi(x,y)]$ where j is the imaginary unit, T is the amplitude transmittance, $\Phi$ is the phase transmittance (also referred occasionally as simply the phase function), and the pairs $(r,\theta)$ or $(x,y)$ give the localization of a point in the plane of the device being related by $x=r \cos \theta$ and $y=r \sin \theta$. The amplitude transmittance modifies an incident beam by reflecting or absorbing part of its energy and transmitting only a fraction of the total energy. Thereby controlling the intensity of the transmitted radiation. The phase transmittance on the other hand does not cause absorption of any fraction of the incident beam and only affects its phase. The superresolution device in the first embodiment of the invention consists of a rotationally symmetric element divided in a number N of concentric circles called zones, with a binary phase transmittance. The minimum phase transmittance is given by $\Phi_1$ and the maximum phase transmittance is given by $\Phi_2$. The net phase shift experienced by the incident beam of light is given by $\Phi_0 = 101_2 - \Phi_1$. The position of each radial zone is given by the quantity $R_i$, $i=0, \ldots, N$, where $R_0=0$ and $R_N=R$, and $2R$ is the diameter of the device. An example of the device in the form of a surface-relief element is shown in FIG. 1A where $N=3$. In this figure a cross-section along an arbitrary diameter is shown. The physical element can be seen as the body of revolution obtained by rotating the cross-section shown by 360°. The plane of the element is indicated by the axis (x,y) or (r,θ). The z-axis indicates the direction of propagation of the incident beam of light. The device is composed of a substrate of an optical material with index of refraction n. To obtain the proper phase transmittance of the zone, the element is fabricated with the correct height h according to the relation shown in FIG. 1A. A variation of this embodiment is shown in FIG. 1B where instead of a surface-relief element it is shown a gradient-index element. In this case the proper value of phase transmittance is obtained by choosing the index of refraction of the appropriate portions according to the relation shown in FIG. 1B. The gradient-index element offers the flexibility of an adjustable thickness for a given optical material of index of refraction $n_0$ but cannot be replicated easily. The opposite happens to the surface-relief element.

To simplify the calculation of the optical properties we will adopt the normalized zone positions, given by $\alpha_i = R_i/R$, $i=0, \ldots, N$. The field $\Psi$ diffracted by this element can be written in the Fraunhofer approximation in the following way $$\Psi(\eta) = \frac{2J_1(\eta)}{\eta} - [1 - \exp(i\phi_0)] \sum_{j=1}^{n-1} (-1)^j \alpha_j^2 \frac{2J_1(a_j\eta)}{a_j\eta}, \quad (1)$$

where $\eta = 2\pi R\rho/\lambda z$ is a normalized a dimensional coordinate at the image plane with transverse coordinate $\rho$ located at the axial coordinate z, and the incident radiation has wavelength $\lambda$, assumed uniform across the aperture, and $J_1$ is the first-order Bessel function. The incident beam may also have a gaussian dependence but the basic diffraction properties remain essentially unaltered.

To obtain a certain spot size it becomes necessary to determine the appropriate values of net phase transmission $\phi_0$ and position of each zone boundary $\alpha_i$, $i=1, \ldots, N$. For this purpose optimization techniques can be employed to search the space of variables for solutions that satisfy some design requirements. As an illustration, let us assume that the minimum tolerable Strehl ratio S is 0.8 and the maximum tolerable value of relative sidelobe intensity to maximum central core intensity (represented by the letter M) for any diffraction ring equals 0.1. In this case the minimum value of spot size G, measured at the first minimum of the intensity diffraction pattern from the origin, relative to the diffraction limit, equals 0.89 (at half-maximum the value is 0.80) with a Strehl ratio S equal to 0.81, M=0.058, when $N=2$, $\alpha=0.225$ and $\phi_0=0.93\pi$. A similar result can be obtained with the $\pi+2\pi q$ phase-shift method mentioned above with a larger number of zones. The method of controlling the amplitude transmittance of each zone can also be used but the Strehl ratio will be reduced even further.

Figure 2:
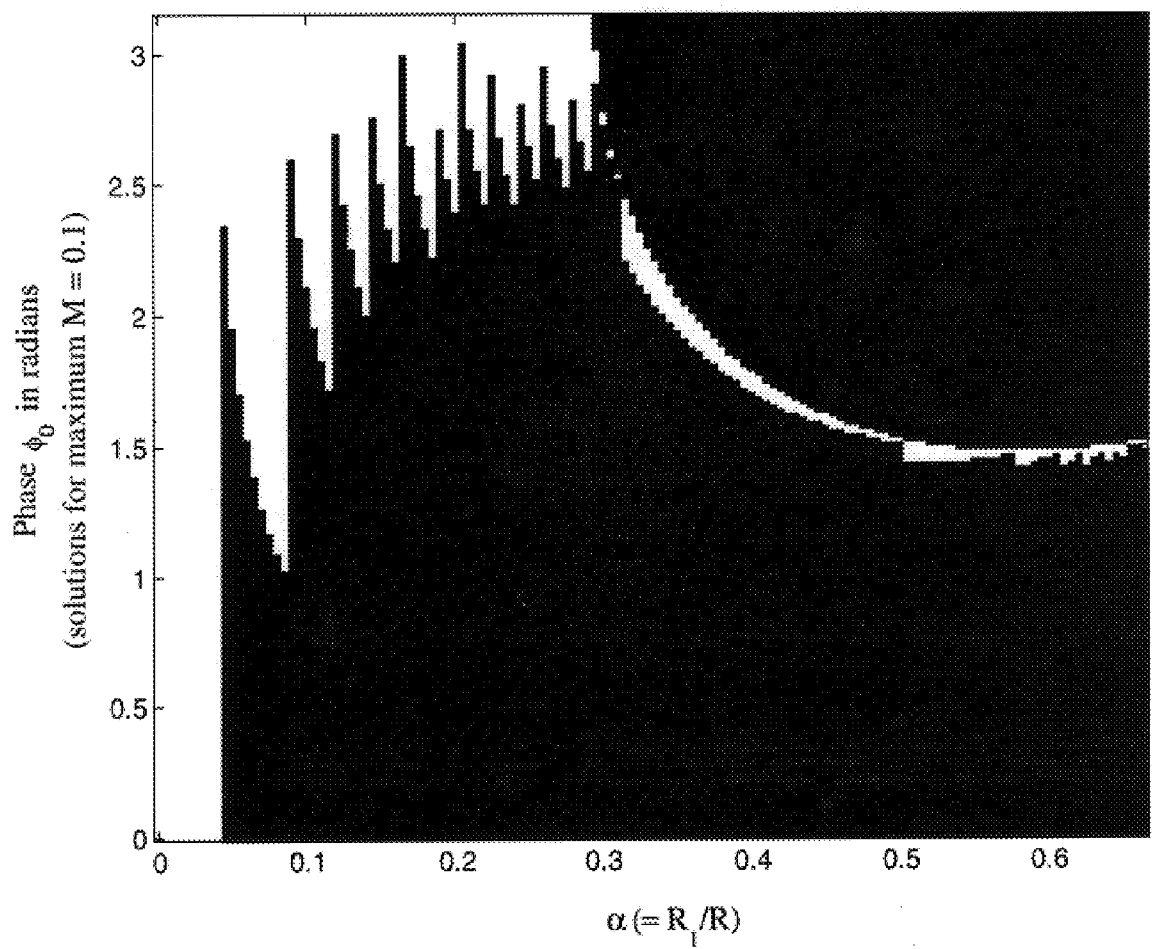
FIG. 2 is a plot which shows in white the values of zone boundary a and phase transmittance $\phi_0$ that results in a point spread function such that the maximum sidelobe intensity M is 0.1. The region in black does not satisfy this condition. The phase fiction employed is illustrated in the diagram labelled FIG. 14.
Figure 2A:
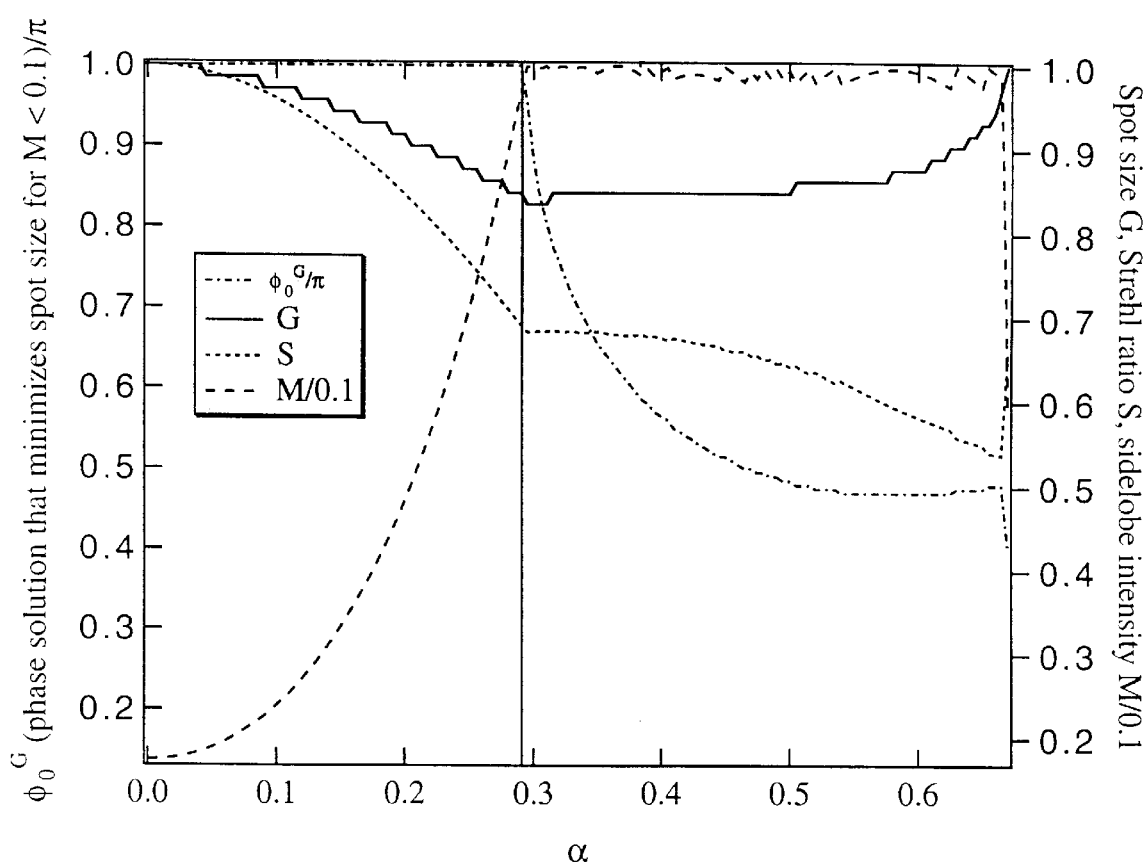
FIG. 2A is a plot which shows the values of spot size G, Strehl ratio S and sidelobe intensity M (normalized to one), for the maximum value of phase transmission $\phi_0^{max}$ (also shown 14.

In fact, for a given number of zones, the conditions of best performance in terms of the combination Strehl-ratio/sidelobe-effects will generally occur for unity amplitude transmission over the entire aperture and values of phase transmission other than $\pi+2\pi q$, q an integer. This fact is illustrated here in the simple case of a filter with only two zones ($N=2$). Due to the small number of available variables, zone boundary $\alpha_1 = R_1/R$ and phase transmittance $\phi_0$, it is possible to characterize every design configuration without the need to use optimization techniques. Let us then consider those cases where the maximum relative sidelobe intensity M is 0.1. FIG. 2 shows in white the set of values of design parameters $\alpha$ and $\Phi_0$ for which the condition $M \leq 0.1$ is satisfied. The region in black defines those design parameters for which $M>0.1$. Associated with each point in this diagram there is a corresponding value of Strehl ratio S, spot size G, and sidelobe intensity M. For a given value of zone boundary $\alpha$ in FIG. 2, consider the maximum value of phase transmittance $\Phi_0$ that satisfies $M \leq 0.1$, since in this case the spot size G tends to assume its smallest value. For this choice of design variables, FIG. 2A shows the values of Strehl ratio S, size G, and sidelobe intensity M normalized to one together with the appropriate value of phase transmittance also normalized to one to facilitate visualization. The solid line at the boundary position $\alpha=0.295$ represents the transition point at which a $\pi$ phase-shift no longer constitutes an acceptable solution. From FIGS. 2 and 2A it becomes clear that the use of a custom phase transmission instead of a $\pi+2\pi q$ phase-shift is advantageous because better results in terms of a spot-size reduction can be obtained with increased tolerances and comparable Strehl ratio. In addition, for the same level of spot-size reduction, a custom phase transmission instead of a $\pi+2\pi q$ phase-shift considerably increase the fabrication tolerances to errors.

Another variation of the present embodiment corresponds to the case where focal power is only needed in one direction, x or y. In this case, the device is not to be considered as a body of revolution but, instead, does not present any variation along either the x or y direction. Identical description as presented above follows with the basic difference being that the circular symmetry is substituted by a linear one. As a result, the superresolution device presents a similar structure to a linear binary grating. A similar procedure to the one described previously based on optimization techniques can be carried out to evaluate the properties of this linear variation.

Even though keeping the amplitude transmittance of the device equal to a value 1 implies in higher values of Strehl ratio, it may be desirable in certain cases to admit other values of amplitude transmittance in one or several zones, in order to increase the number of design variables. This variation of the present embodiment may be interesting in problems requiring several constraints to be satisfied by the diffraction pattern and when performance is not affected by the reflection or absorption of light. This case however requires no additional discussion since the diffracted field is modified in a very simple way and the same optimization techniques mentioned previously can be used.

To fabricate a device as described in the present embodiment there are several possible alternatives that can be employed. A technique of great flexibility and power to obtain surface-relief elements is based on diffractive optics technology (C. G. Blough, D. Faklis, S. K. Mack, R. L. Michaels, and S. J. Ward, Proc. SPIE 2600 (1995) 50; M. T. Gale, M. Rossi, J. Pederson, and H. Schütz, Opt. Eng. 33 (1994) 3556), which makes use of a laser pattern generator or a single-point diamond turning machine to define a surface-relief pattern on a photoresist-coated substrate, later processed in such a way that the relative height of each zone correctly implements the designed phase transmittance. The pattern so produced can then be used to replicate other devices inexpensively. Another process to obtain a surface-relief pattern is thin-film deposition where successive layers of material are superposed and further processed. The desired phase transmittance can also be obtained as a so-called gradient index device where the phase shift between consecutive zones is attained by a variation of the values of refractive index along the device. Yet another technique is based on computer-generated holography where the transmittance function is printed on a computer system and later photoreduced and processed. If a nonunity amplitude transmittance is required, appropriate coating or masking of the device will be necessary.

Figure 3:
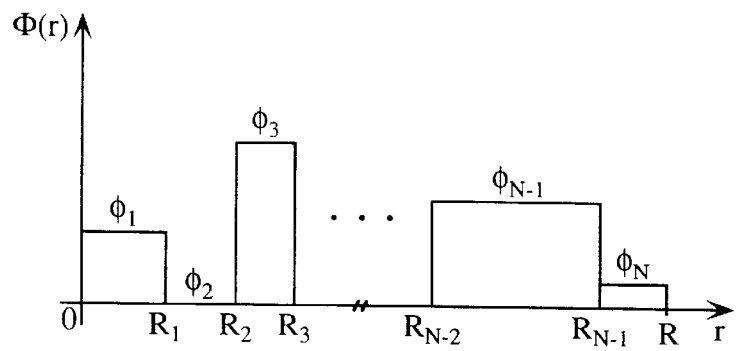
FIG. 3 is a cross-section of the rotationally symmetric phase transmittance function of the superresolution device in accordance with a second embodiment of the invention.
Figure 3A:
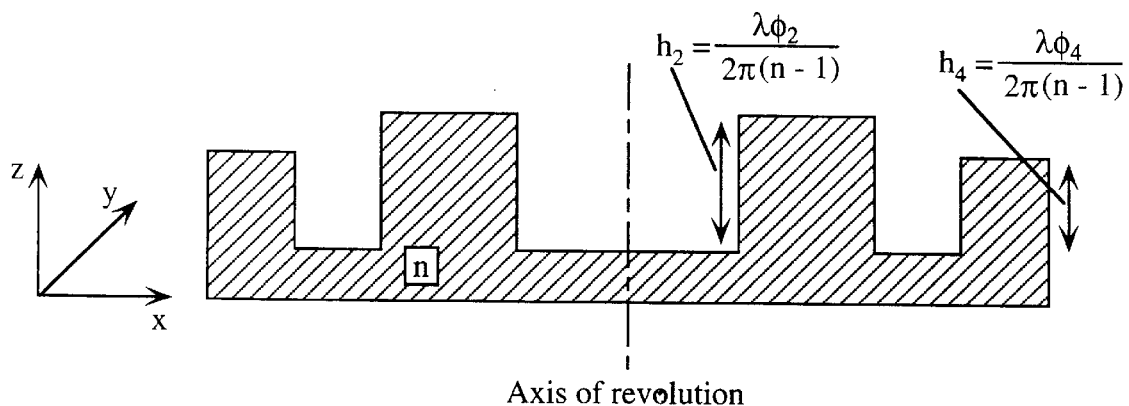
FIG. 3A is a schematic representation of the cross-section of a surface-relief device with a phase function shown in FIG. 3 for a case of four zones.
Figure 3B:
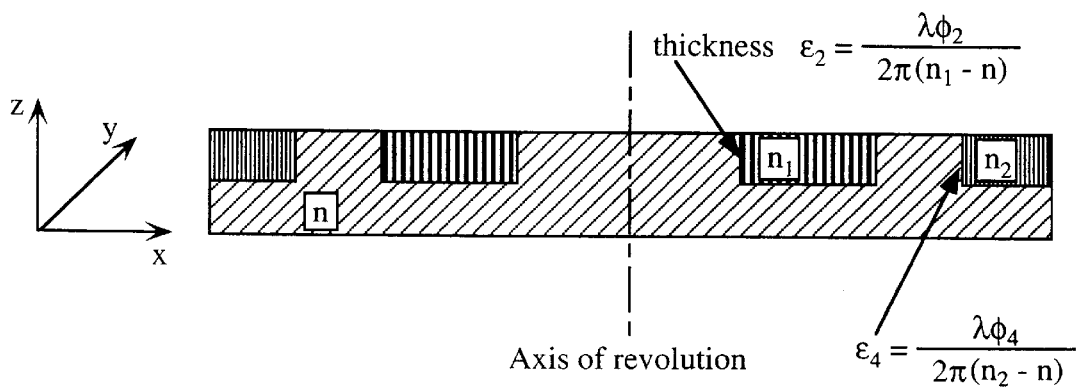
FIG. 3B is a schematic representation of the cross-section of a gradient-index device with a phase function shown in FIG. 1 for a case of four zones.

A second embodiment of the invention is shown in FIG. 3, where now the phase transmittance of each zone can attain any value in the interval between 0 and $2\pi$. The general expression for the diffracted field $\Psi$ in Fraunhofer approximation is given as $$\Psi(\eta) = \sum_{j=1}^{n} e^{i\Phi_j} \left[ a_j^2 \frac{2J_1(a_j\eta)}{a_j\eta} - a_{j-1}^2 \frac{2J_1(a_{j-1}\eta)}{a_{j-1}\eta} \right], \quad (2)$$

where $\Phi_i$, i=1,...,N, defines the phase transmittance of each individual zone. As a result, the number of design variables increase considerably, making available a wider range of possible solutions for given diffraction constraints. The additional design variables are in addition to the zone boundary positions already available and, if desired, the amplitude transmittance of one or more zones, similarly to the process described in the previous embodiment. As before, to determine a certain desired design specification, one must use optimization search techniques to determine the appropriate physical parameters. FIG. 3A shows a cross-section of a surface-relief element along an arbitrary diameter. The complete element can be seen as a body of revolution obtained by rotating the cross-section shown by 360°. The labels are the same as presented in FIG. 1 and 1A. FIG. 3B shows the superresolution device in the form of a gradient-index element. The thicknesses must be correctly chosen for the given indices of refraction, which can be all different or not. The labels are the same as presented in FIG. 1B. The same comments regarding fabrication and amplitude transmittance made in the previous embodiment applies in the present one.

Figure 4:
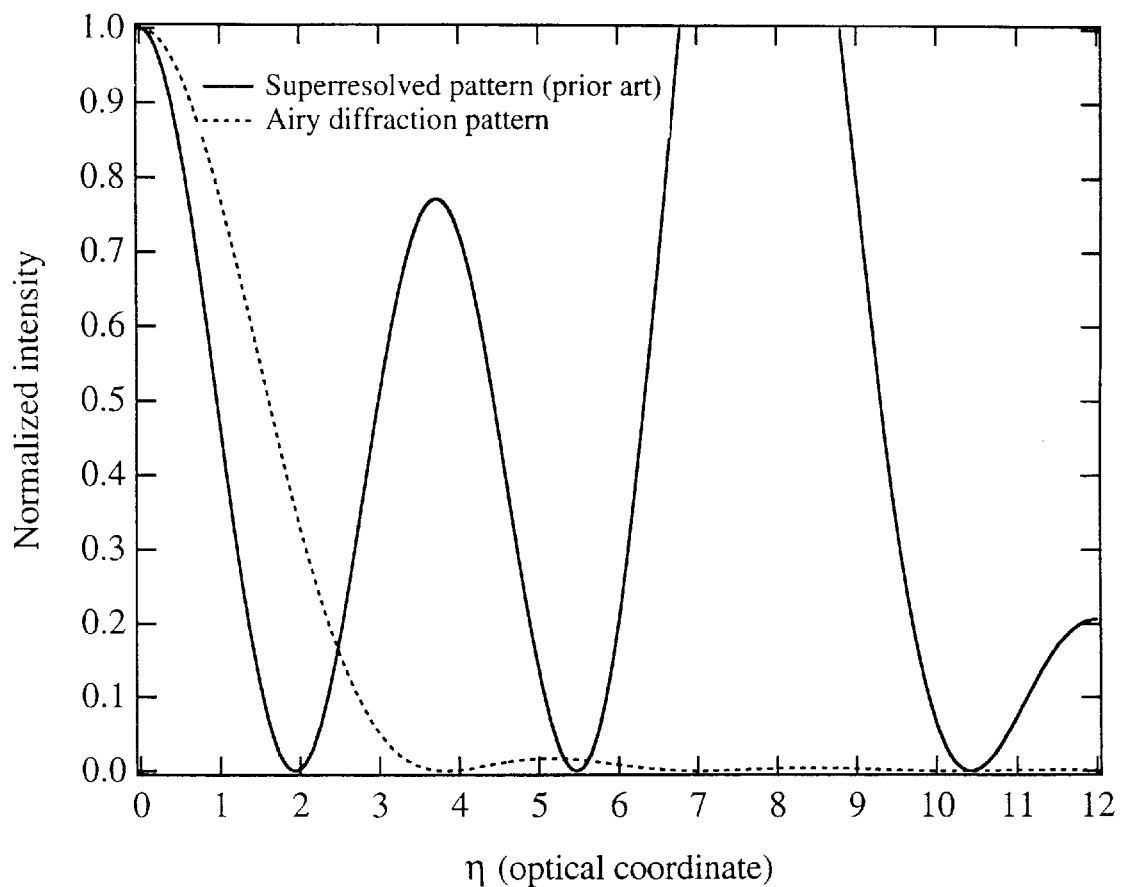
FIG. 4 is a plot which shows a diffraction pattern obtained with a superresolution unit of the prior art (J. E. Wilkens and V. Sarafis article or the Ando patent) for a specific realization of an element with three zones. The phase function of the zones is illustrated in FIG. 15.

A superresolution element with multiple phase values in each zone allows an improvement over previous designs for several reasons. It generally presents higher Strehl ratio than filter designs based on the variation of amplitude transmittance for a certain level of spot size G and sidelobe intensity M. With respect to the $\pi+2\pi q$ phase-shift method, there is an increase in the number of available design variables. An additional advantage is that even for a small number of zones there is a large number of possible diffraction patterns that can be generated, by varying the phase of each zone accordingly. Also, the tolerances are more forgiving than in prior art, analogously to the results observed in relation to the binary element described in the previous embodiment. As an specific example, consider a phase-only element composed of 3 distinct zones. The zone boundaries are represented by the pair $(\alpha_1,\alpha_2)=(0.3,0.7)$. In other words, the first zone is defined by the interval from the origin $\alpha=0$ to $\alpha_1=0.3$, the second zone is in the interval from $\alpha_1=0.3$ to $\alpha_2=0.7$, while the third and last zone is defined by the interval from $\alpha_2=0.7$ to the edge of the element at $\alpha=1$. We do not illustrate the method that employs amplitude transmittance since it decreases the Strehl ratio. On the other hand, if the $\pi+2\pi q$ phase-shift method is adopted for the particular choice of zone boundaries specified above, one finds the diffraction pattern illustrated in FIG. 4. Even though the spot size becomes considerably small with parameter G assuming an approximate value 0.5, the Strehl ratio is only 0.04 and there is no useful field of view with M=1.65. As a result, this pattern cannot be used in most practical applications, since one needs not only a small spot size but an acceptable combination of spot size, Strehl ratio, and sidelobe intensity. These three quantities must simultaneously assume adequate values in order to find use in applications such as imaging, optical heads, or printer systems. An improvement over the limitations posed by prior art is shown next with the present embodiment.

Figure 5A:
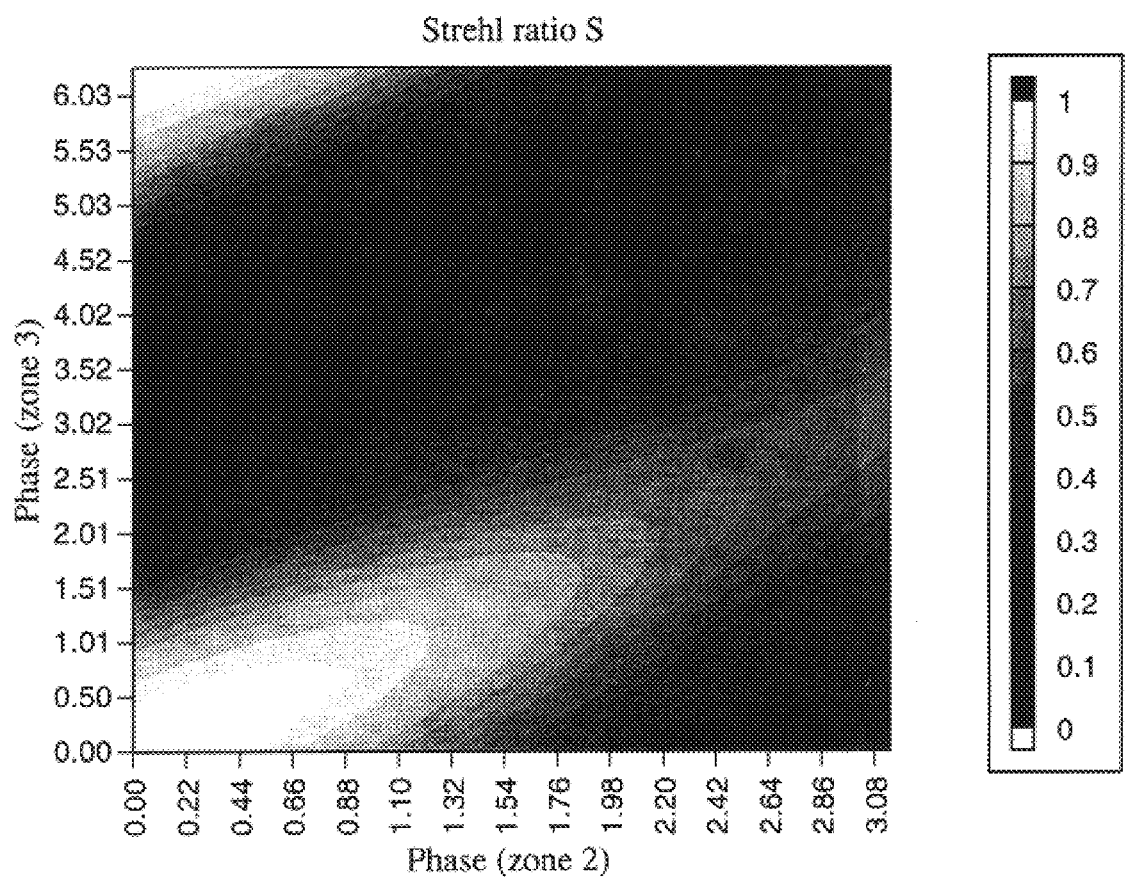
FIG. 5A is a plot which shows the values of Strehl ratio S obtained with the second embodiment for a specific realization of an element with three zones. The phase function employed is shown in FIG. 16.
Figure 5B:
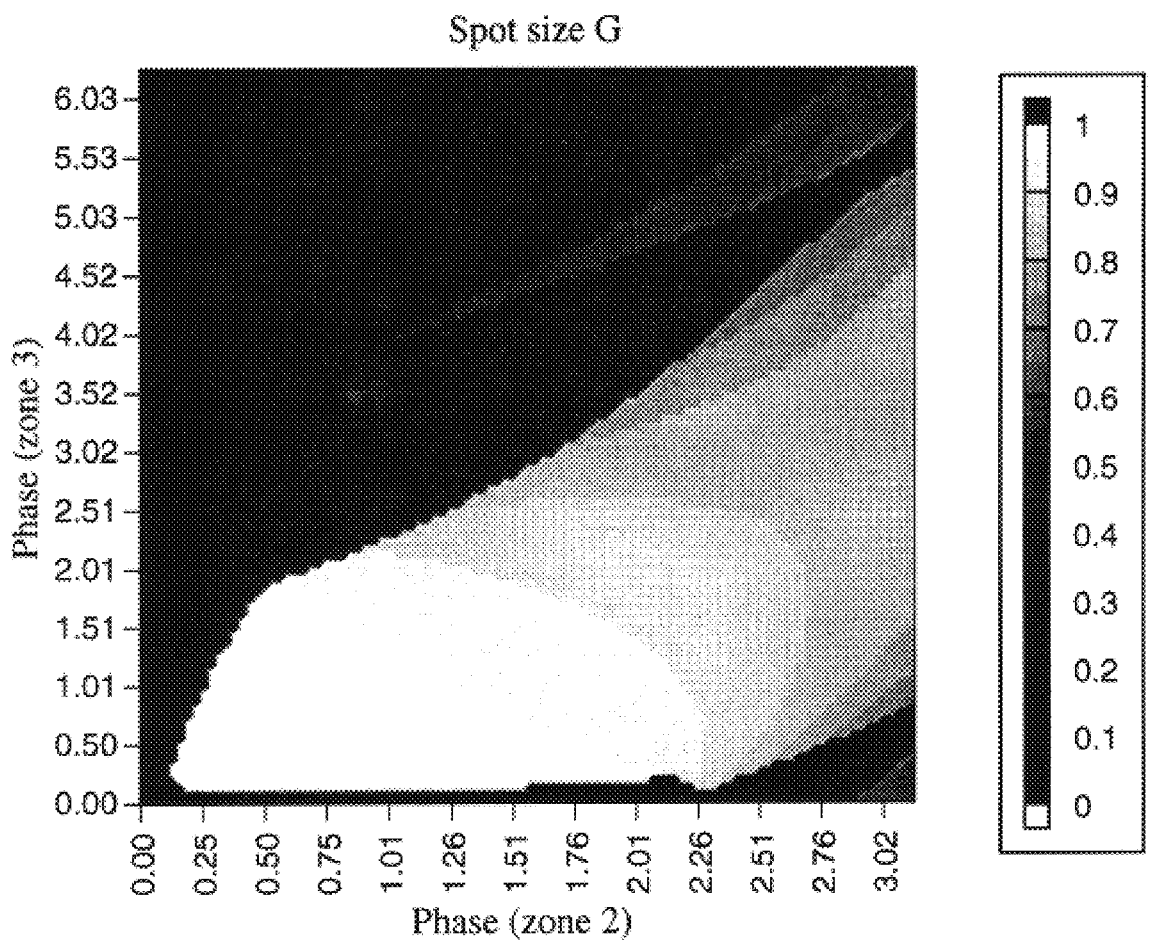
FIG. 5B is a plot which shows the values of spot size G obtained with the second embodiment for a specific realization of an element with three zones. The phase function is as shown in FIG. 16.
Figure 5C:
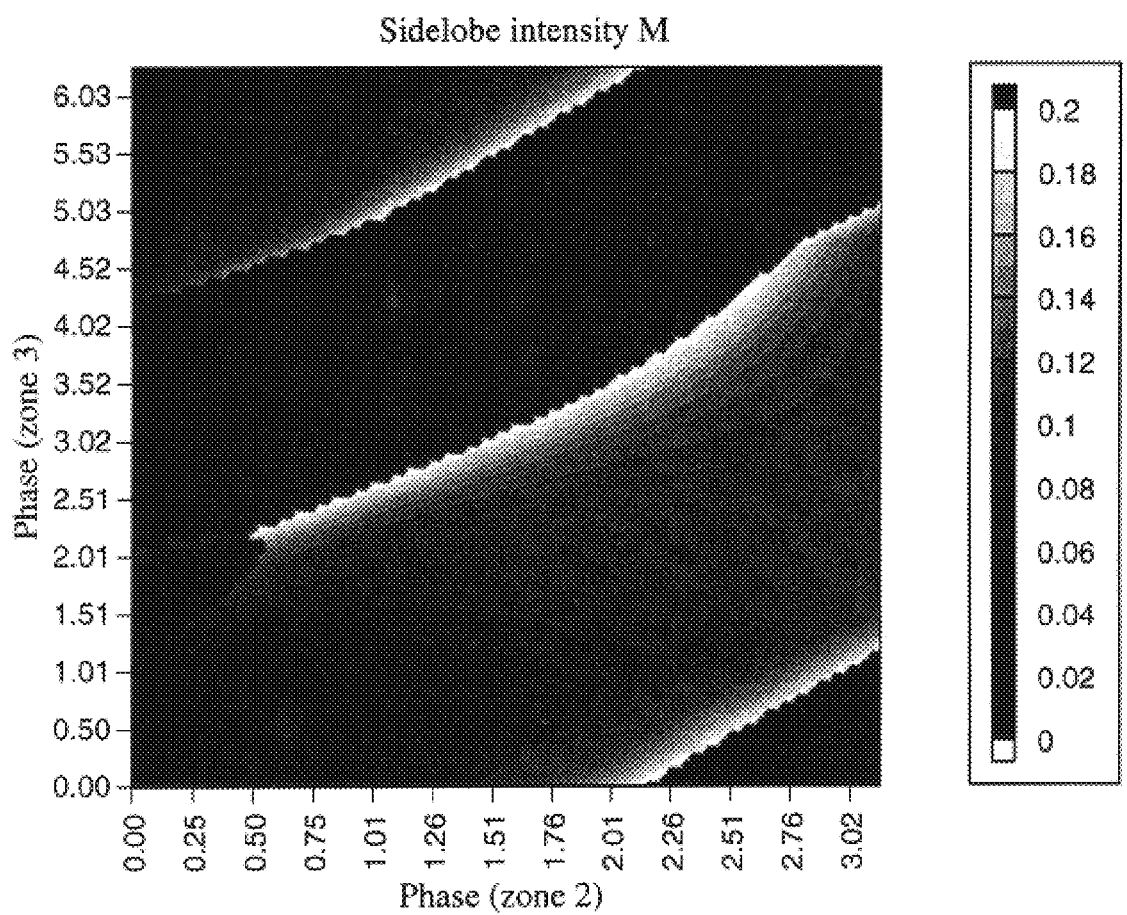
FIG. 5C is a plot which shows the values of sidelobe intensity M obtained with the second embodiment for a specific realization of an element with three zones. The phase function is an shown in FIG. 16.
Figure 6:
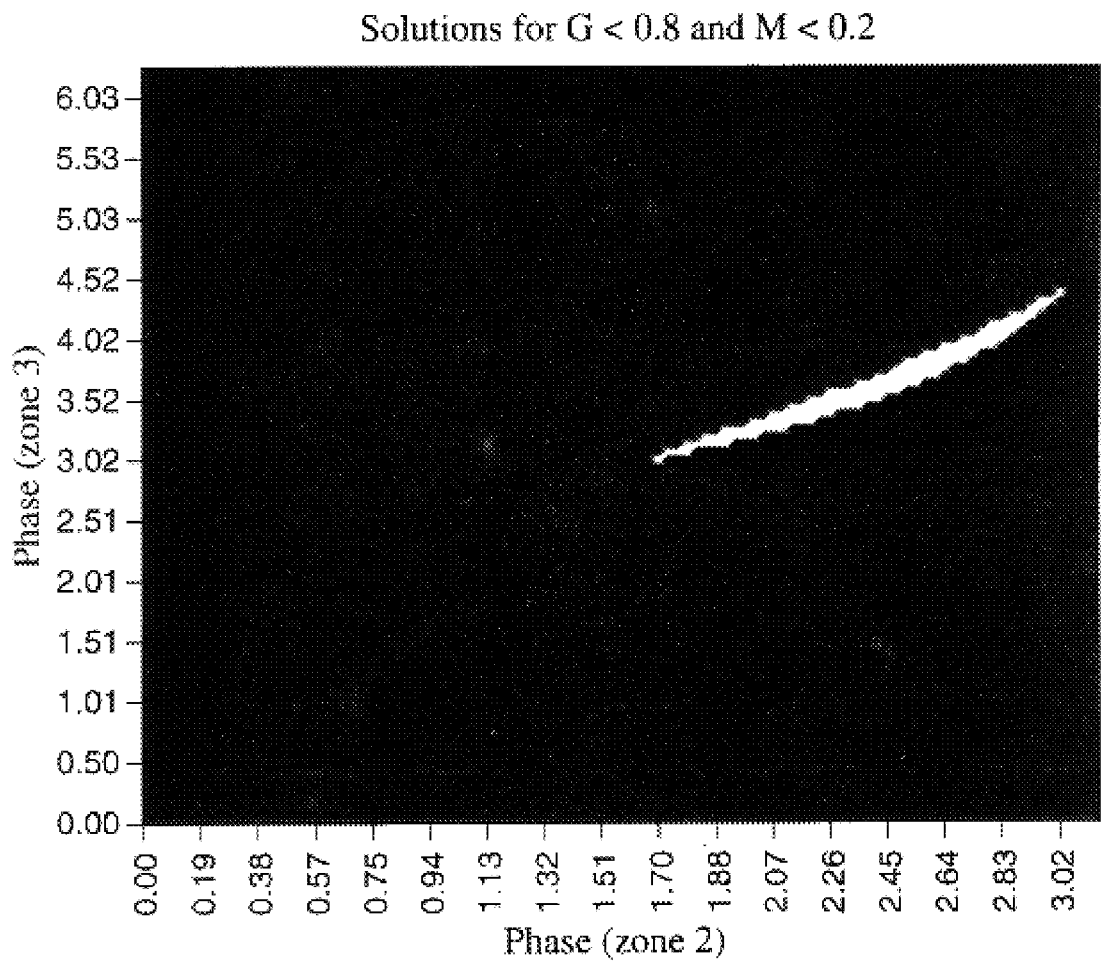
FIG. 6 is a plot which shows solutions for G<0.8 and M<0.2 with the second embodiment for a specific realization of an element with three zones. The phase function is as shown in FIG. 16.
Figure 6A:
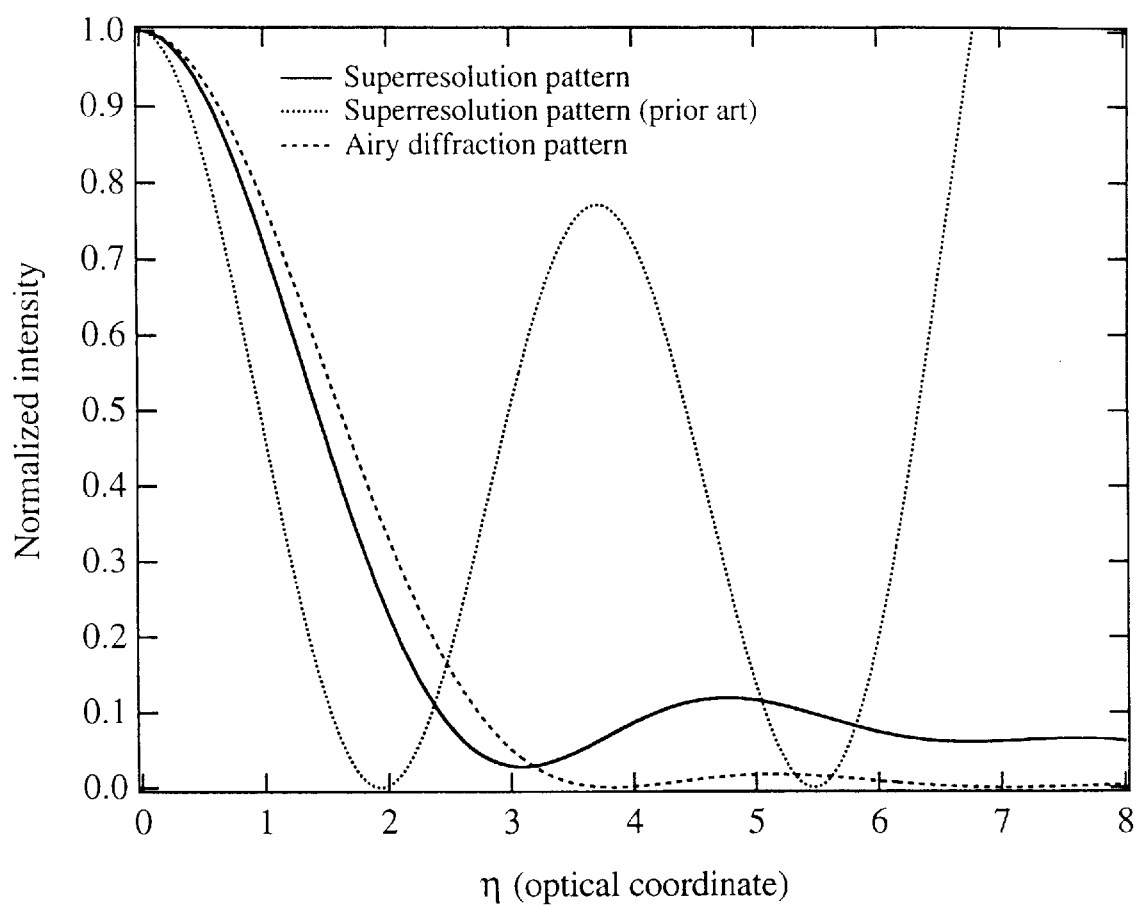
FIG. 6A is a plot which illustrates a diffraction pattern that satisfies G<0.8 and M<0.2 with the second embodiment for a specific realization of an element with three zones. The phase function is as shown in FIG. 16.

Consider the three-zone element where $(\alpha_1,\alpha_2)=(0.3,0.7)$. Let us now arbitrarily fix the phase transmittance of the first zone to zero and allow the phase transmittance of the two remaining zones to assume any possible value. We consider only values of phase transmittance that are not redundant, that is, a transmittance value $\Phi_0+2\pi q$, q an integer, will be taken as $\Phi_0$. FIGS. 5A, 5B, and 5C show two-dimensional plots of the values obtained for Strehl ratio S, spot size G, and sidelobe M, respectively. The sampling of each plot is 101 points in each axis. In this resolution the minimum value of Strehl ratio S equals 0.0004 while the maximum sidelobe intensity equals 271.2. In FIG. 5B only those solutions for which G<1 are shown, the remaining cases are unacceptable for superresolution and belong to the black region. In FIG. 5C only those solutions for which M<0.2 are shown, the remaining cases belong to the black region. As a result, the number of solutions satisfying some desired criteria for S, G, and M can increase considerably. To determine some specific design, these three plots can be used to obtain a proper solution. For other values of zone boundary, similar plots can be constructed by direct calculation and characterization of the diffraction pattern. If the number of zones exceed 3, then optimization search techniques can be employed. To provide a more specific example, consider those cases where the minimum spot size is 0.8 and a maximum value of sidelobe intensity 0.2 is desired. The possible solutions for this specific case, as obtained from the plots in FIGS. 5A, 5B, and 5C, are shown as the white region of FIG. 6. The black region denotes unacceptable solutions. For these design requirements, the Strehl ratio is about 0.48 and the maximum sidelobe intensity is 0.16, acceptable for readout in an optical head. In FIG. 6A it is illustrated one such solution for which the phase of zone 1 equals 2.86 and the phase of zone 2 equals 4.15. The spot size G equals 0.8, the Strehl ratio S is 0.42, and the sidelobe intensity M is 0.127.

Figure 7:
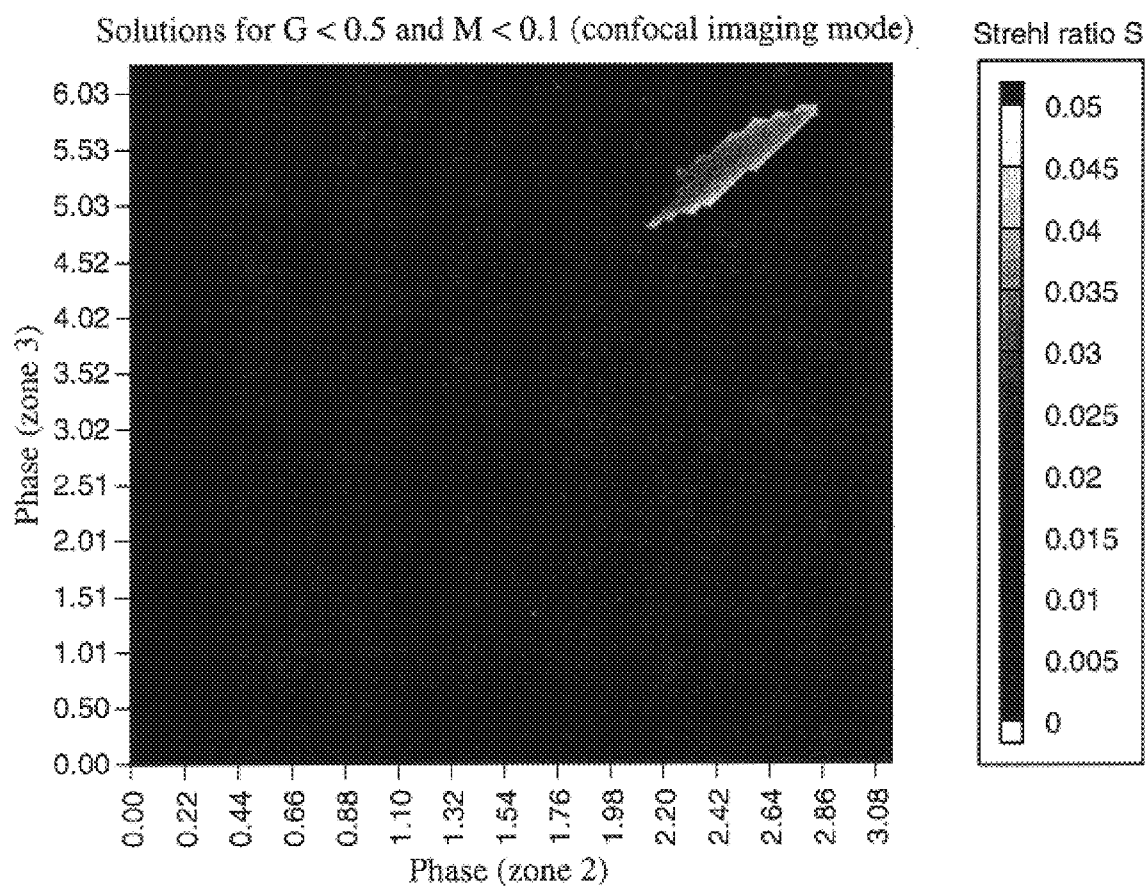
FIG. 7 is a plot which shows solutions for G<0.5 and M<0.1 with the second embodiment for a specific realization of an element with three zones and phase function of FIG. 16, in the confocal imaging mode.
Figure 7A:
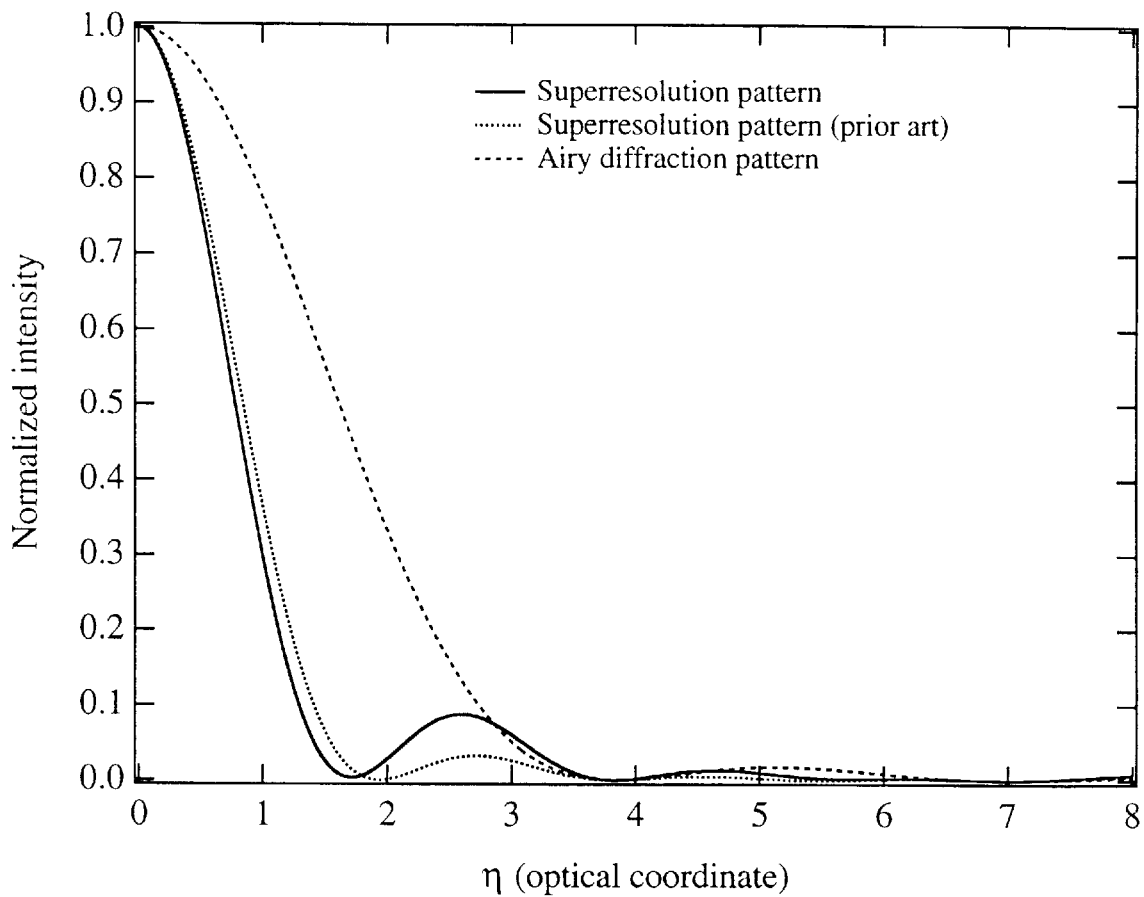
FIG. 7A is a plot which illustrates a diffraction pattern that satisfies G<0.5 and M<0.1 with the second embodiment for a specific realization of an element with three zones and phase function of FIG. 16, in the confocal imaging mode.

The above discussion illustrates the well-known fact that a superresolution element based on the $\pi+2\pi q$ phase-shift method will generally present the minimum values of spot size G, even though the Strehl ratio S can be quite low and the sidelobe intensity M can be quite high. Even though prior art has focused on the application of this method in optical heads for data storage, it is in fact more suitable for applications where a confocal imaging is employed. Since in the confocal imaging the total point spread function is comprised of the product of the point spread function of two independent subsystems, the sidelobe effects can be suppressed to some extent. In the example discussed above, where the zone boundaries are given by $(\alpha_1,\alpha_2)=(0.3,0.7)$, we saw that S=0.04, G=0.5, and M=1.65 for the $\pi+2\pi q$ phase-shift method. In conventional imaging, these characteristics are inadmissible for most applications. However, if this same element is used in confocal imaging with the other subsystem being just a clear aperture, the diffraction pattern is now characterized by S=0.04, G=0.5, and M=0.0324. Notice that the new level of sidelobe intensity poses no practical limitation. However, even when confocal imaging is employed, the present embodiment can be used to obtain even smaller values of spot sizes while keeping the satisfactory levels of Strehl ratio and small sidelobe intensity. As an example, FIG. 7 shows solutions satisfying G<0.5 and M<0.1 in the confocal imaging mode. The region in black denotes unacceptable solutions. The minimum value obtained for G is 0.44 while the maximum value of Strehl ratio increases to 0.0465. The bar code is for Strehl ratio S. Notice that the values of S are easily adequate for applications such as scanning confocal microscopy. In addition to an improvement in performance notice also that the tolerances are also improved. While for such low level of spot size the $\pi+2\pi q$ phase-shift method tends to be quite sensitive to errors, any point in the clear region of FIG. 7 offers better performance with reasonable tolerancing. In FIG. 7A it is illustrated one specific solution for which the phase of zone 1 equals 2.32 and the phase of zone 2 equals 5.28. The spot size G equals 0.44, the Strehl ratio S is 0.0273, and the sidelobe intensity M is 0.0875.

Figure 8:
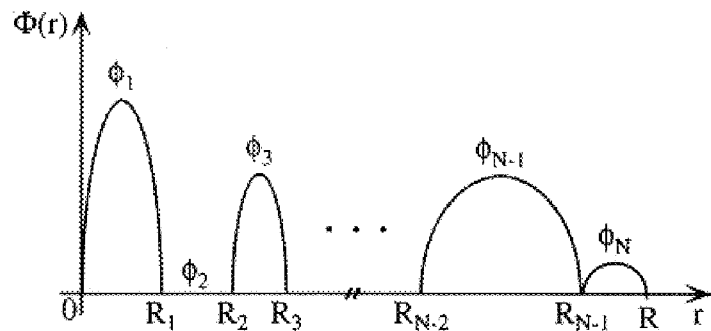
FIG. 8 shows a cross-section of the rotationally symmetric phase transmittance function of the superresolution device in accordance with a third embodiment of the invention.
Figure 8A:
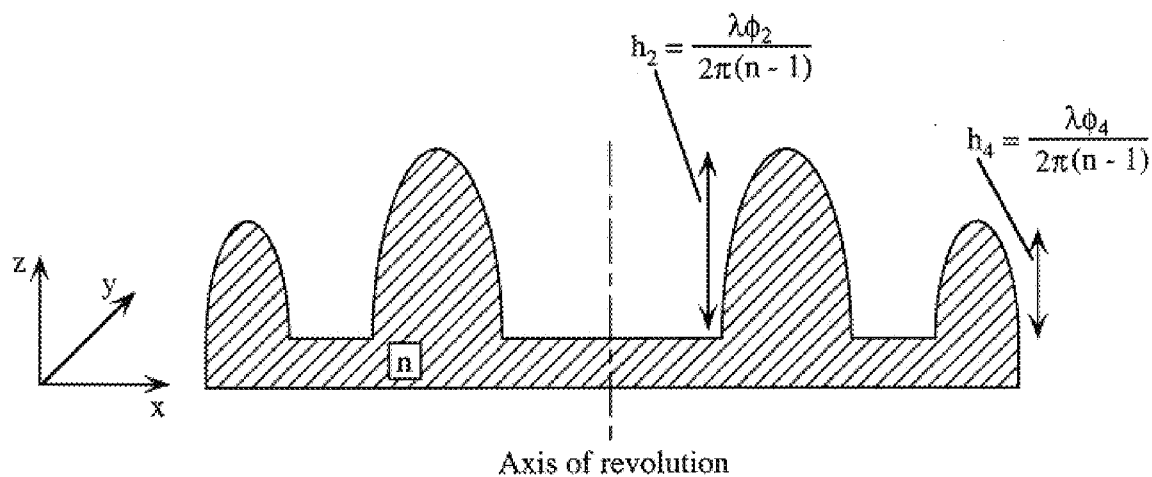
FIG. 8A is an schematic representation of the cross-section of a surface-relief device with a phase function shown in FIG. 8 for a case of four zones.
Figure 8B:
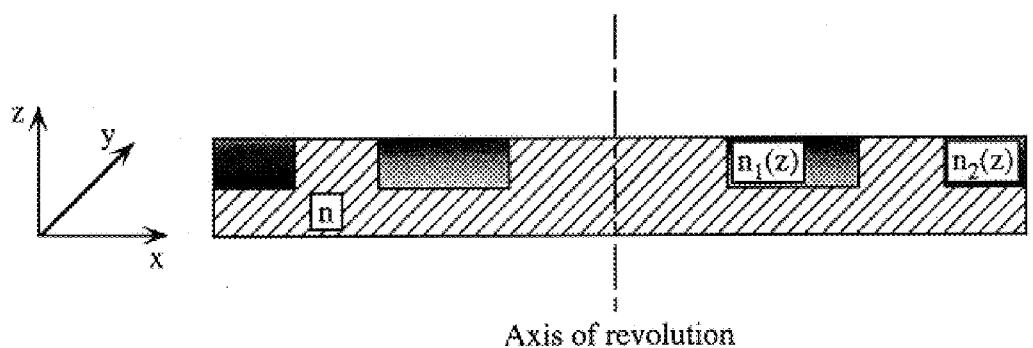
FIG. 8B is an schematic representation of the cross-section of a gradient-index device with a phase function shown in FIG. 8 for a case of four zones.

A third embodiment of the invention is shown in FIG. 8 where the function defining the phase transmitted by a given zone assumes a continuous instead of the discrete form exhibited by the two previous embodiments. In order to calculate the diffracted field in this case, one must use the diffraction integral in the Fraunhofer approximation directly as given below $$\psi(\eta) = 2\int_0^1 e^{i\Phi(r)} J_0(\eta r) r dr, \quad (3)$$

where $\Phi$ defines the phase function that characterizes the device, r is the radial coordinate at the plane of the device, and $J_0$ is the Bessel function of order zero. With respect to the two previous embodiments, one can see that the number of design variables increases considerably since the continuous profile can be defined in a variety of distinct ways, including any particular function that may be further fabricated by any of the techniques to be described later or any other technique that can achieve the same purpose. As an example, one could consider a general polynomial expansion of the form $\Phi(\eta) = \alpha_0 + \alpha_1\eta + \alpha_2\eta^2 + \alpha_3\eta^3 + \ldots$ . FIG. 8A shows a cross-section of a surface-relief element along an arbitrary diameter. The complete element can be seen as a body of revolution obtained by rotating the cross-section shown by 360°. The expression defining the phase function of each individual zone may also be distinct from one another. The labels are the same as presented in FIG. 1 and 1A. FIG. 8B shows the superresolution device in the form of a gradient-index element. The thickness in this case presents a functional dependence along the z axis which must be correctly chosen to result in the desired phase modification of the incident beam of light. The labels are the same as presented in FIG. 1B. The same comments regarding fabrication and amplitude transmittance made in the first embodiment applies to the present one.

Figure 9:
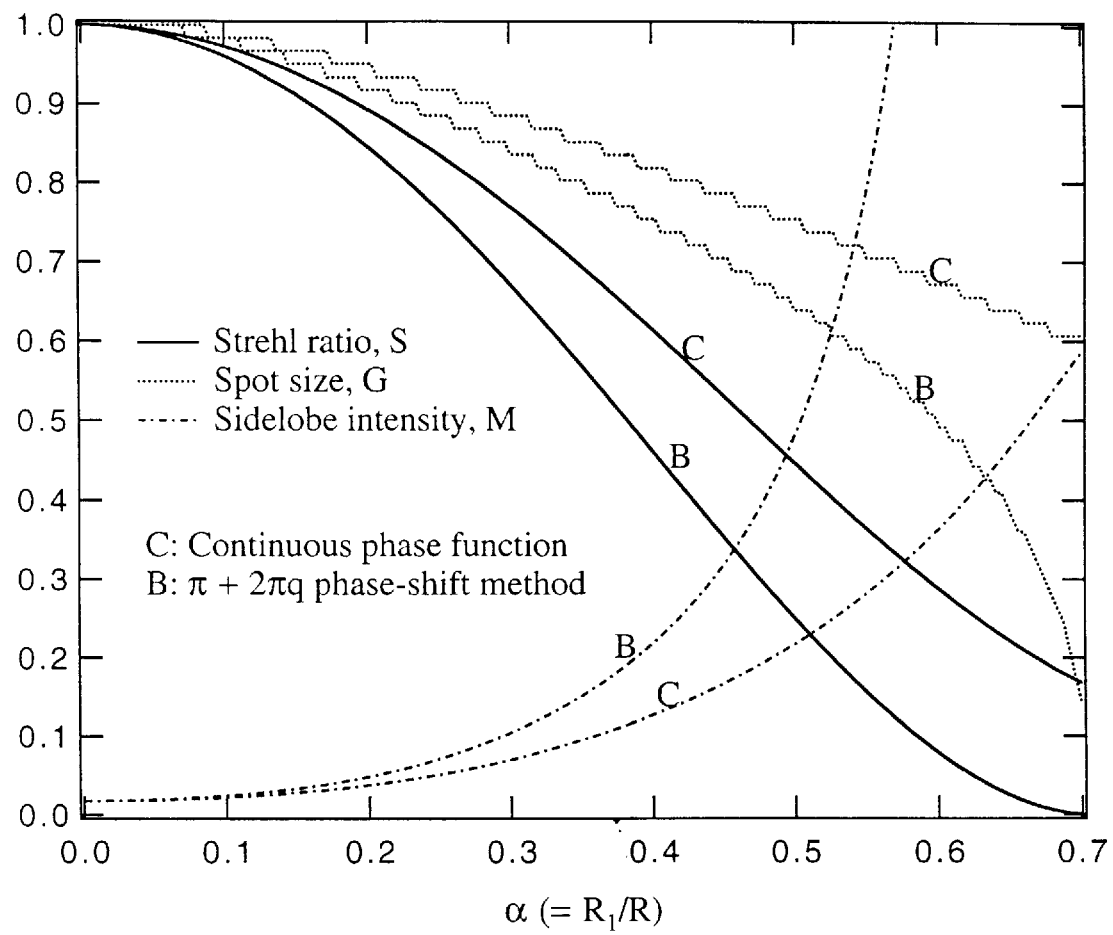
FIG. 9 is a plot which shows the diffraction properties of the superresolution device of the third embodiment compared to prior art. The continuous phase function or phase shift and the $\pi$ phase shift functions are shown in FIGS. 17 & 18, respectively.

To provide a more specific example consider a case with N=2 with the following definition for the phase function $$\phi(\alpha) = \begin{vmatrix} 0, & \text{if } 0 \le \alpha < \alpha_1 \\ \frac{\phi_0}{\left[\frac{1}{2}(1-\alpha_1)\right]^{2P_0}} \left|\alpha - \frac{1}{2}(1+\alpha_1)\right|^{2P_0} + \phi_0, & \alpha_1 \le \alpha \le 1, \end{vmatrix} \quad (4)$$

where $\alpha_1$ denotes the boundary of the first zone and $p_0$ is an appropriate number that enables the control of the shape of the continuous phase function. In this example, we have considered a simple functional form for the blaze profile of each zone with one extra degree of freedom $p_0$ to basically control the form of the profile. In a more general case the number of design variables can increase considerably if one assumes a polynomial dependence with a given number of terms. The particular shape of each zone can also be distinct among themselves. This design flexibility is useful when used together with optimization techniques. In addition to this advantage, the continuous phase design of the present embodiment improves considerably upon previous designs because it allows a better control of sidelobe effects and increases the Strehl ratio, as presented in FIG. 9 for the phase function shown in EQ. 4 when $p_0=1$. The result for the continuous-blaze profile is also compared to the $\pi+2\pi q$ phase-shift method. The phase function of each case is illustrate in the diagram shown in FIG. 9 where it is seen that the only difference between the two cases reside in the form of the phase function but the maximum phase height and the zone boundary are kept identical. The curves in FIG. 9 show the spot-size G, the Strehl ratio S, and the sidelobe intensity M for both the continuous blaze-profile and the $\pi+2\pi q$ phase-shift method. The purpose of this plot is to illustrate the fact that the use of a continuous phase function tends to cause a certain increase in the spot-size but on the other hand increases the Strehl ratio and dramatically improves the effects of sidelobes. In this example, the maximum value of sidelobe intensity reaches the value 860 for the $\pi+2\pi q$ phase-shift method while its maximum value is 0.6 for the continuous-blaze profile filter. The proper control of sidelobes is particularly important for those applications such as optical disk systems and imaging where large diffraction rings cannot be tolerated. In the same way described in the previous embodiment, the number of available design variables can be increased even further by allowing each particular zone or every zone to present a nonunity amplitude transmittance.

Figure 10A:
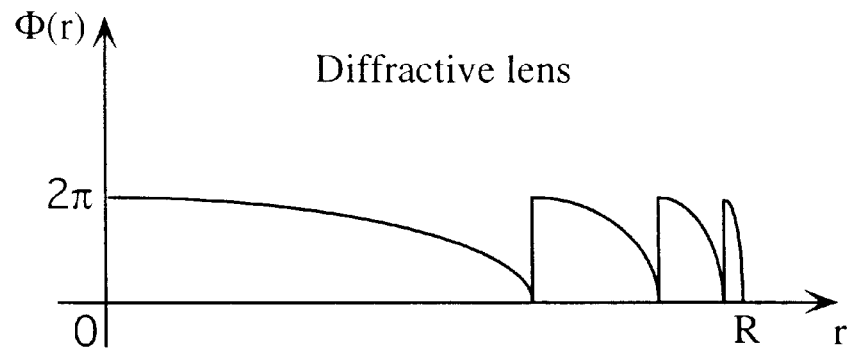
FIGS. 10 A, B & C show respectively the phase function of a diffractive lens, of a superresolution device or element, and of the resulting superresolving lens, obtained by combination of the lens and device.
Figure 10B:
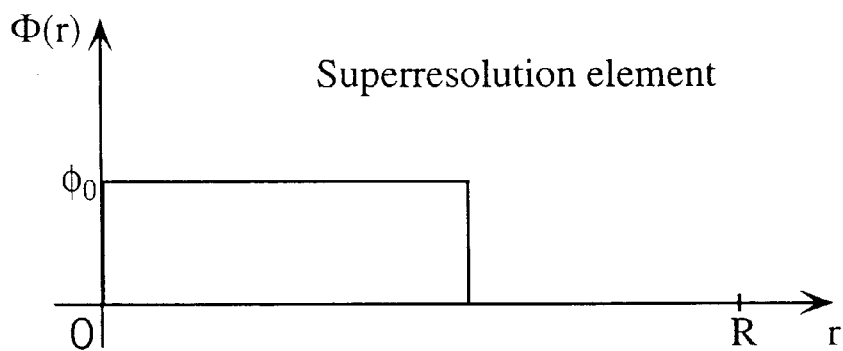
Figure 10C:
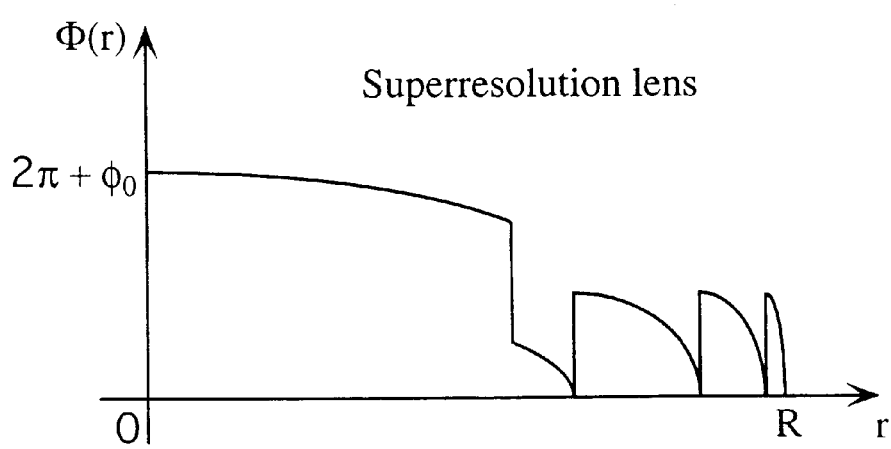

In yet another embodiment of the invention shown in FIG. 10, the rotationally symmetric superresolution masks described above are integrated with a hybrid diffractive-refractive or a diffractive lens to yield what we call a superresolution lens. Diffractive lenses are well-known devices capable of performing the same operation as a refractive lens with less weight, volume, and cost. In addition, diffractive lenses can be combined with refractive ones to form hybrid diffractive-refractive lenses, which often improve the performance of an optical system. For a given application the hybrid lens can be designed using any available commercial lens design program. The superresolution mask is designed according to the techniques described previously. If the phase function of the diffractive optical element, be it purely diffractive or hybrid, is $\Phi_{DOE}$ and the phase function of the superresolution device is $\Phi$, then the phase function of the final element is given by $\Phi_{DOE}+\Phi$, as illustrated in FIG. 10. The final phase function of the integrated element is then the sum of the individual phase functions. Consequently, the procedure for designing the superresolution device is carried out as described in previous embodiments. The same comments regarding fabrication and amplitude transmittance made in the first embodiment applies in the present one.

Figure 11:
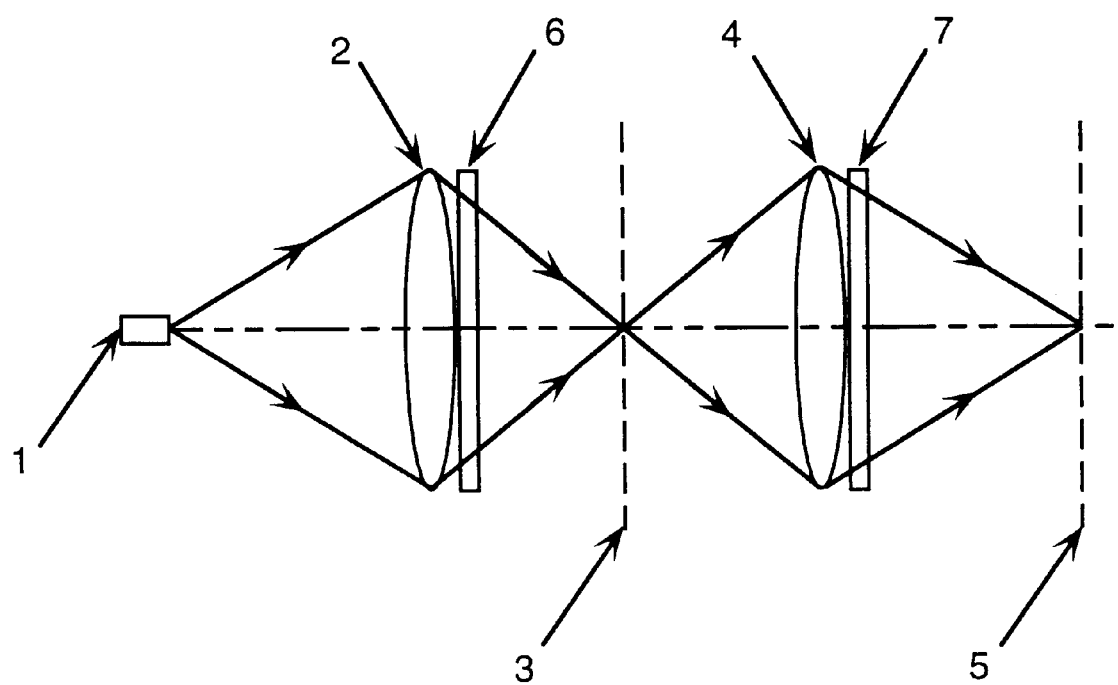
FIG. 11 shows a confocal imaging system employing a superresolution device embodying the invention.

FIG. 11 shows a confocal imaging system which form the basis for the confocal scanning microscope. While in the conventional microscope the whole sample object is imaged through the system, in the confocal scanning microscope the object is scanned by use of the optical system schematically shown in FIG. 11 together with additional electronics for control, processing, and display. The system shown in FIG. 11 is as follows. The illumination is provided by a laser source 1 that emits light towards the objective lens 2. The objective lens focuses on plane 3, where the sample object to be scanned is positioned. Light emerging from the object at plane 3 is collected by a second collector lens 4 which focuses it to a point detector at plane 5. As the object is scanned, its parts are detected and with the help of additional electronics an image can be formed. In the confocal imaging mode, the point spread function of the entire system is composed of the product of the point spread function of the individual lenses. As a result, this imaging system naturally exhibits superresolution effects with respect as described above (FIGS. 1, 1A & B or 3, 3A & B or 8, 8A & B) to the half-width central spot size. This effect can be enhanced by placing superresolution devices 6 & 7 in accordance with masks in contact with the objective (2) or/and collector lens (4). These devices may also be called elements or masks. Another configuration can be considered where instead of using masks in contact to the objective or/and collector lens, the objective 2 is a superresolution lens and the collector lens 4 can also be a superresolution lens such as shown in FIG. 10.

Figure 12:
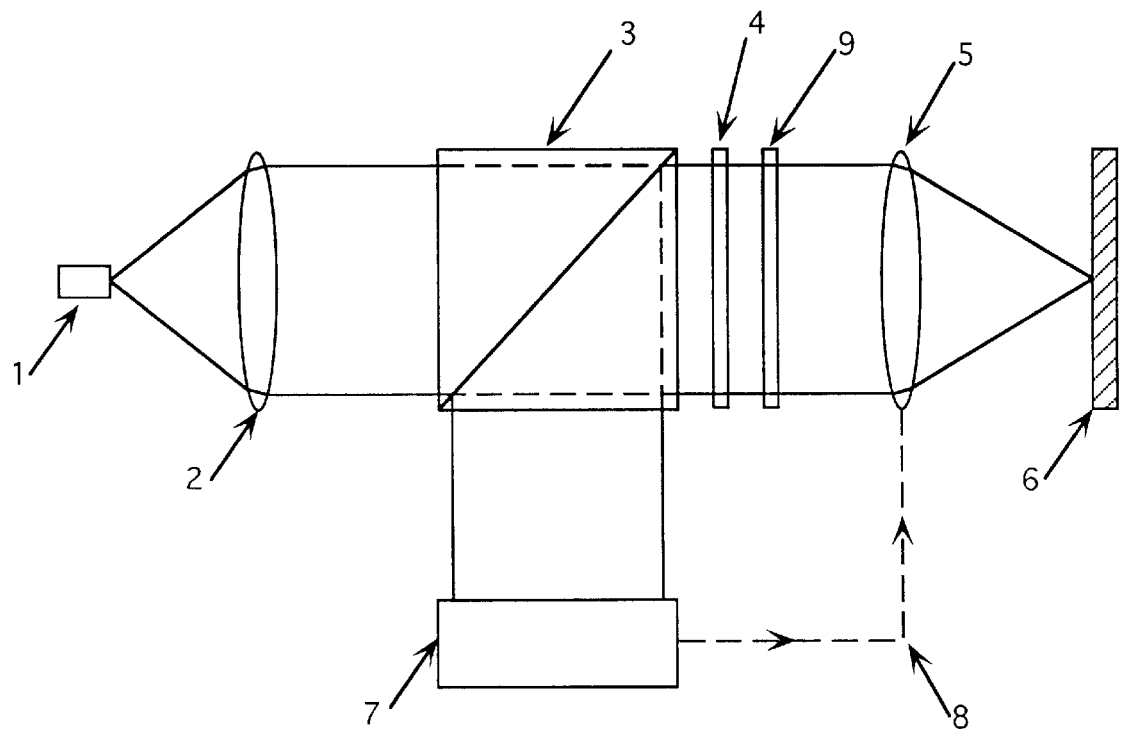
FIG. 12 shows an optical recording disk system employing a superresolution device embodying the invention.

In a optical disk system one can either record or readout information stored in an optical disk. These two situations place very different requirements on the optical devices such as lenses, beam splitters, and so on, that constitute such system. In both cases the superresolution masks according to the present invention can reduce the spot size of the light beam and consequently increase the information density in recording and read information encoded in small marks (pits) along the tracks with better performance than the beam spot produced by a conventional objective. FIG. 12 shows a simplified recording optical disk system. Most of the light produced by the laser source 1 is collected by a first lens 2, and collimated towards a system of prisms and a polarizing beam splitter 3, where the beam is circularized. Part of the beam traverses towards the optical disk 6, after propagating through a quarter-wave plate 4 and an objective lens 5. Light reflected from the optical disk is detected by a system 7 of lenses, detectors, and additional electronics, where the information is processed. In order to assure the proper focusing by the objective lens, system 7 provides a focus and track system 8 that constantly optimizes the positioning of the objective 5 to a best focus. In this scheme the superresolution device 9 according to the present invention is positioned immediately before the objective lens 5. There are several possible configurations for optical disk heads and location of the superresolution device may be selected such that the image formed on the optical disk is superresolved. In another disk system (not shown) the objective lens in the optical disk system may be a superresolving diffractive lens described in FIG. 10C. In another disk system (not shown) an element like those of FIGS. 1, 1A,B, or 3, 3A & B or, 8A & B but with zones in a spiral to provide a spiral lens or a diffractive superresolution lens (FIG. 10 may be used) instead of the conventional objective depicted in FIG. 12.

Figure 13:
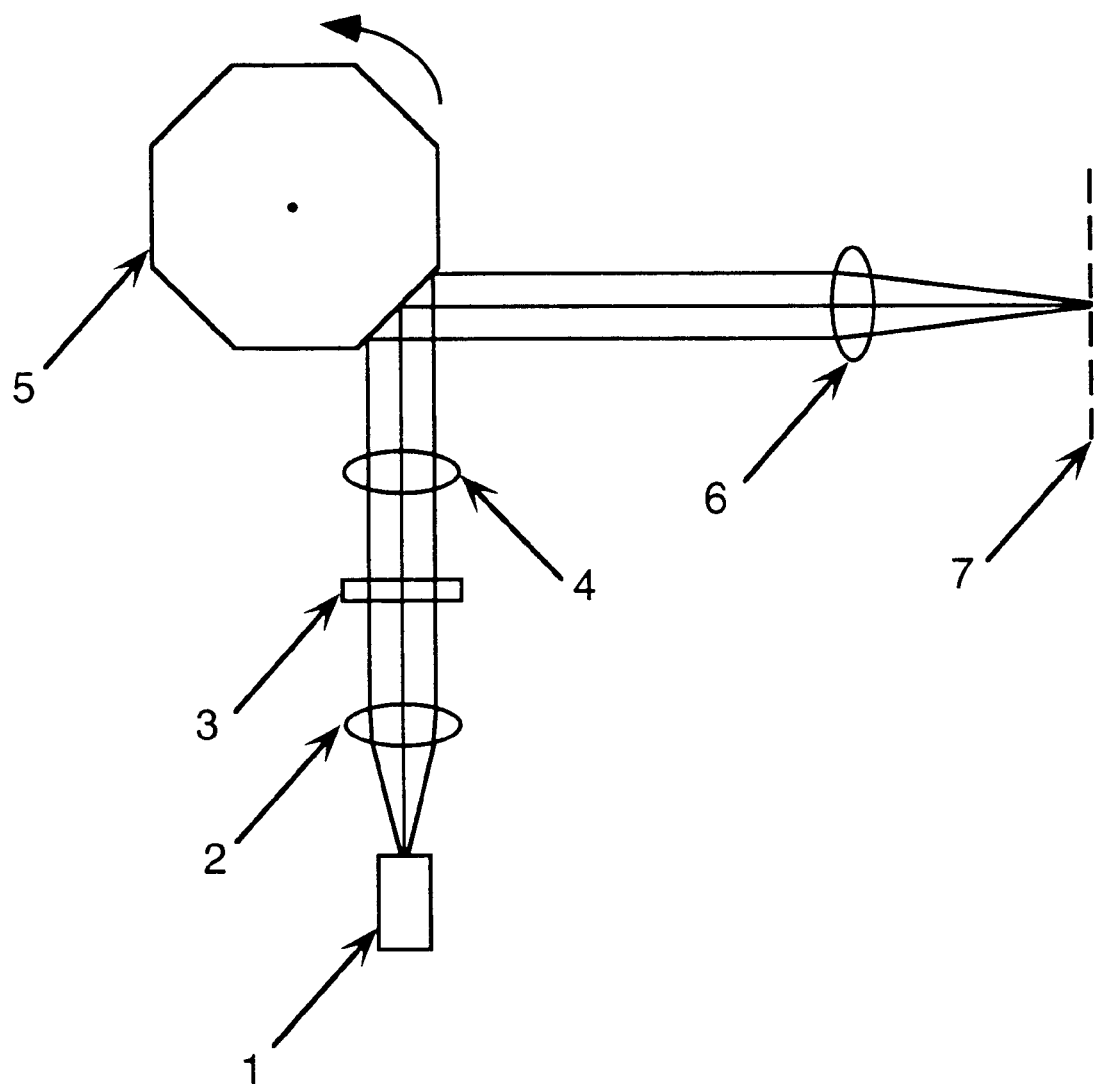
FIG. 13 shows a printing or reprographic system employing a superresolution device embodying the invention.
Figure 14:
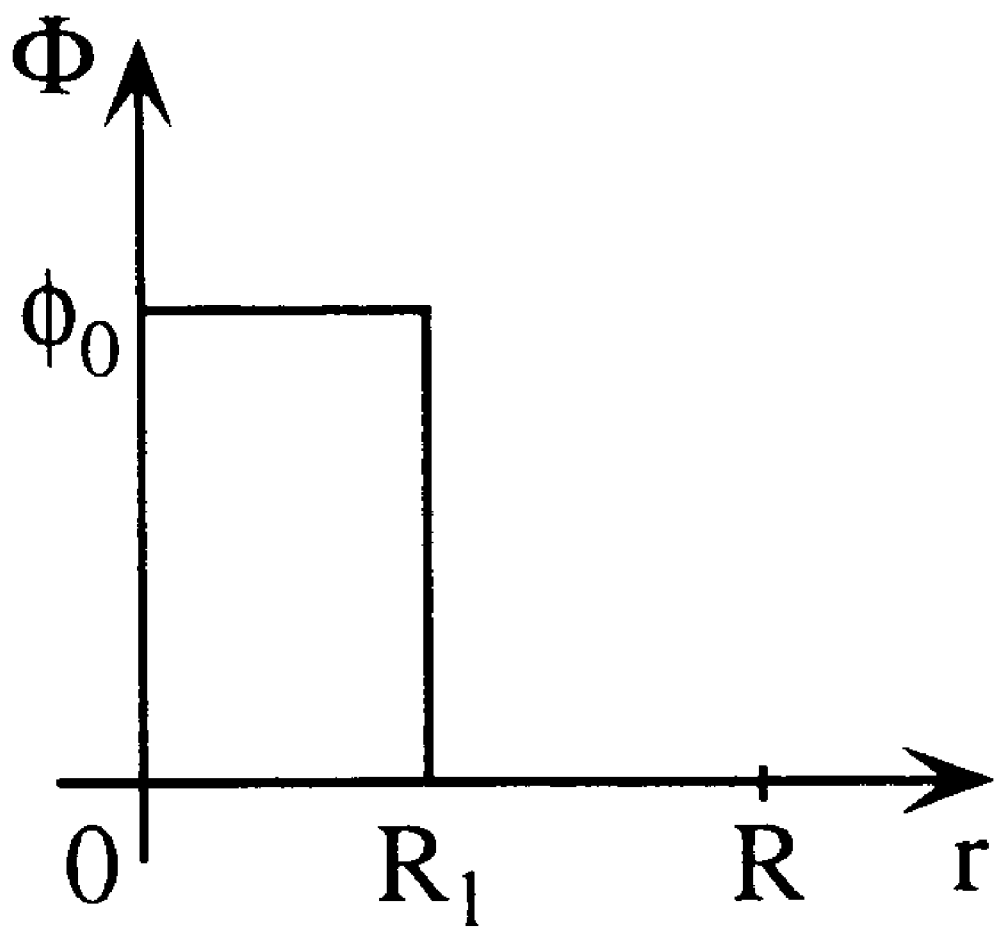
FIGS. 14–18 are curves illustrating phase functions.
Figure 15:
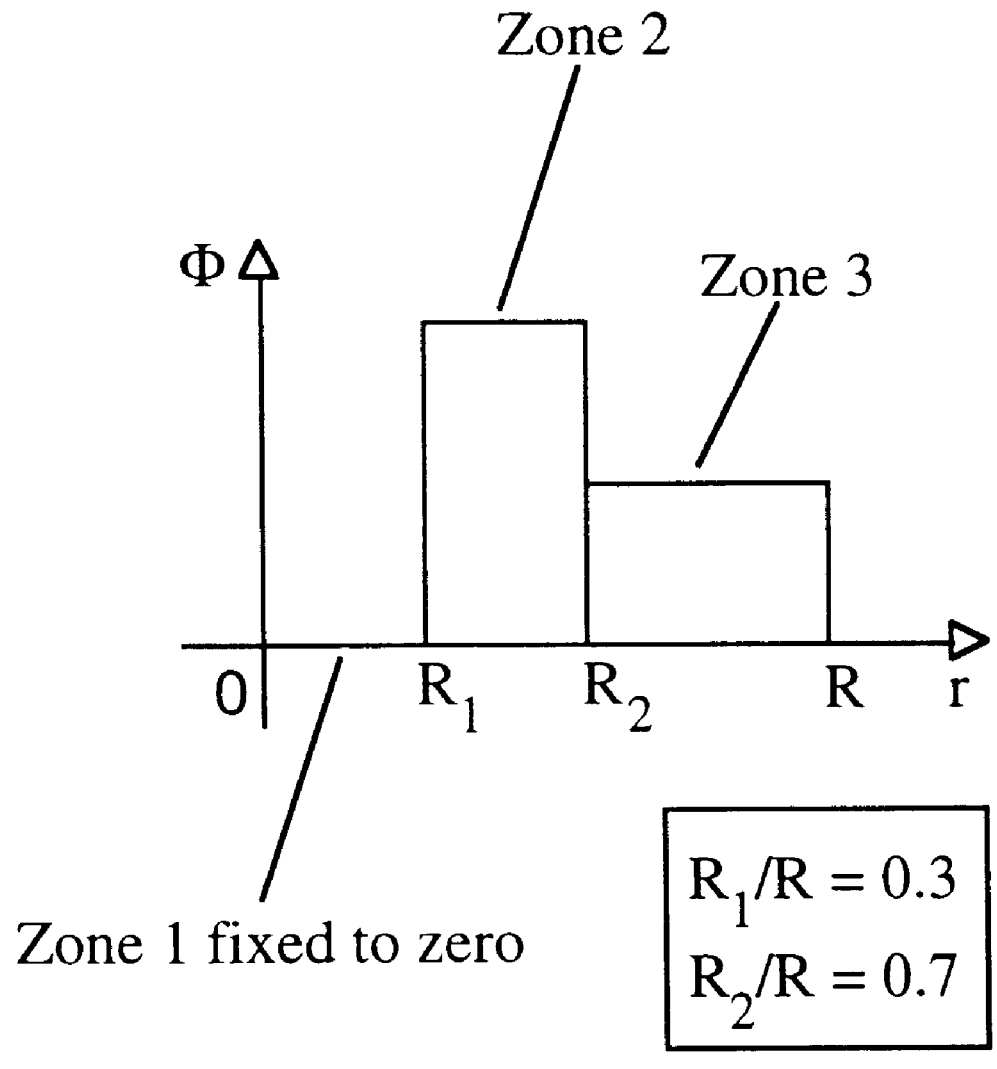
Figure 16:
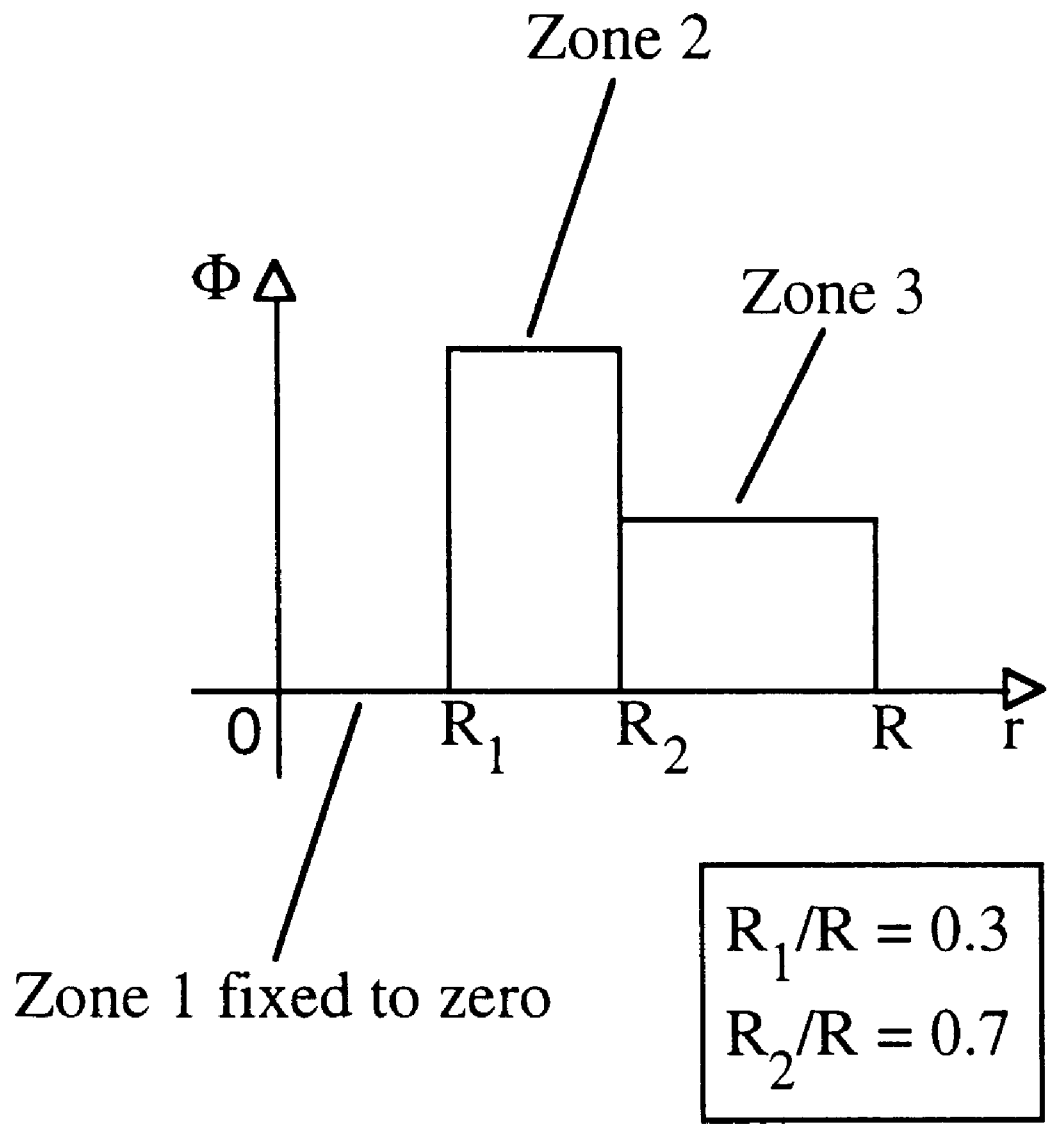
Figure 17:
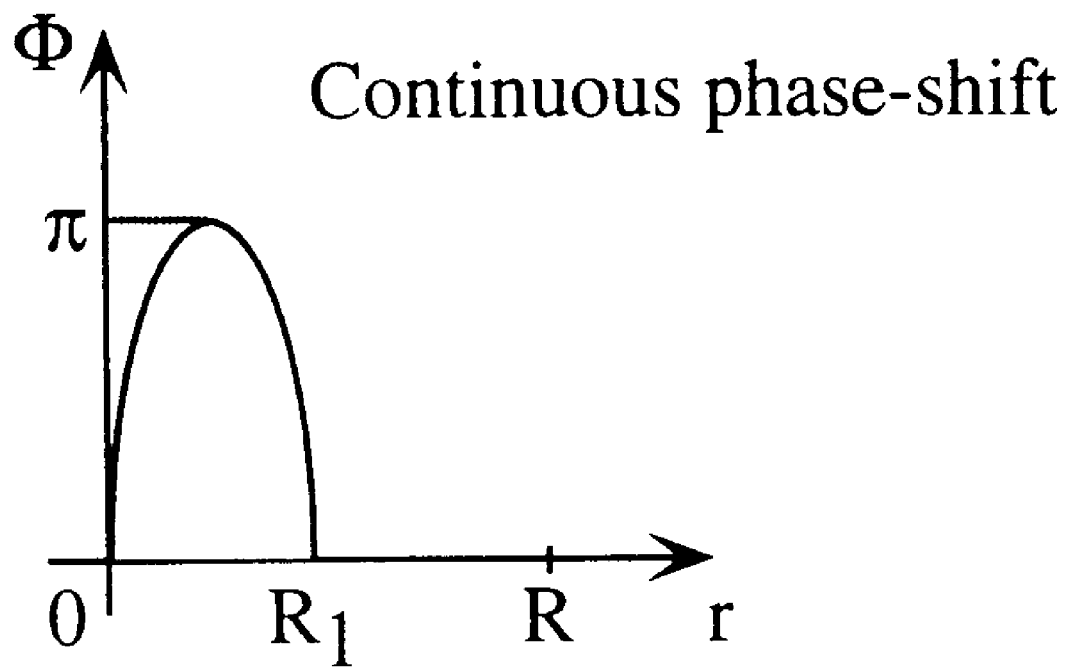
Figure 18:
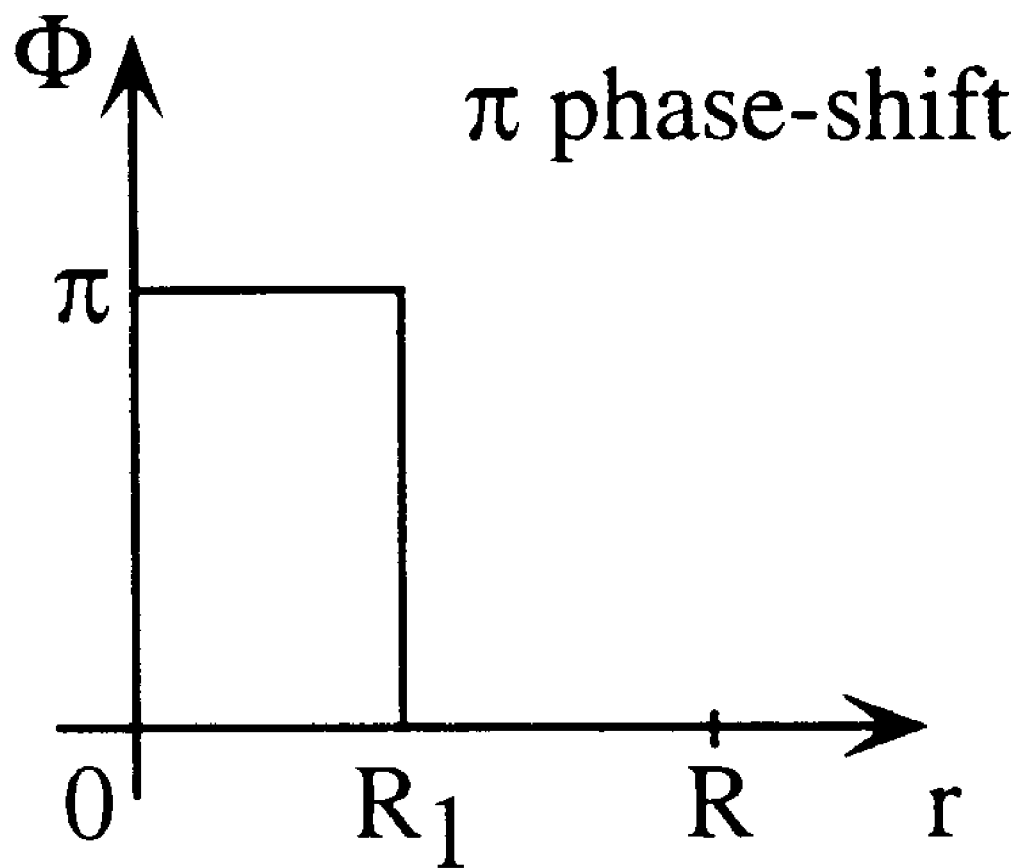

The laser printing system shown in FIG. 13 comprises a laser source 1 (typically a semiconductor diode laser), a collimating lens 2, a superresolution mask 3 of the above described embodiments FIG. 1, 1A, B or 3, 3A, B or 8, 8A, B) and a cylindrical lens 4. The cylindrical lens 4 generates a line image that is reflected on a rotating polygonal mirror 5 and directed toward an f-theta lens assembly 6. The f-theta lens assembly 6 is constituted by a set of lenses that focuses the line image onto a light sensitive substrate positioned in plane 7. The superresolution mask 3 increases the optical resolution of the printing system. In another configuration the cylindrical lens 4 or a component of the f-theta assembly may be a superresolving diffractive lens or a spiral lens.

In summary the invention provides:

Binary superresolution device (first embodiment).

Multiphase superresolution device (second embodiment).

Continuous-blaze superresolution device (third embodiment).

Superresolution lens (fourth embodiment).

We claim:

1. A system that provides super resolution for imaging radiation at, or projection of radiation images to a desired location, said system comprising a radiation transmission element via which the radiation passes and with a change in phase in intensity to exclusively provide super resolution for the images of said radiation.

2. The system of claim 1 wherein said element is selected from a group of elements consisting of (a) an element which has two indices of refraction and variable transmittance;

(b) an element which presents one of a plurality of indices of refraction and variable transmittance; and (c) an element which presents a variable index of refraction and transmittance across a beam of the radiation.

3. The system of claim 1 wherein said element is a focussing element.

4. The system of claim 3 wherein said system is a confocal scanning imaging system for viewing a body microscopically and having means for transmitting the radiation as an optical beam and said focussing element images said beam to a spot on the body.

5. The system of claim 3 wherein said system is an optical disc system having means for transmitting the radiation as an optical beam via which said beam is transmitted and focussed on said disc by said focussing element.

6. The system of claim 3 wherein said system is a reprographic system having means for transmitting the radiation as an optical beam of a wavelength to which a substrate is sensitive, mans for converting the beam to a line image focussed on said substrate with the aid of said focussing element.

7. A superresolution device comprising a plurality of zones, separated by spaces, in a substrate, selected from transmissive and reflective material, where the zones and spaces define a binary phase transmission function of the form $t=T(r,\theta)\exp[j\Phi(r,\theta)]$ or $t=T(x,y)\exp[j\Phi(x,y)]$ where $j$ is the imaginary unit, $T$ is the amplitude transmittance, $\Phi$ is the phase transmittance (also referred occasionally as simply the phase function), and the pairs $(r,\theta)$ or $(x,y)$ give the localization of a point in the plane of the device being related by $x=r\cos\theta$ and $y=r\sin\theta$.

8. The device of claim 7 where the zone positions are given by the quantity $R_i$, $i=0,\ldots,N$, where $R_0=0$ and $R_N=R$, and $2R$ is the diameter of the device and the device provides a normalized diffracted field $\Psi$ given by $$\Psi(\eta) = \frac{2J_1(\eta)}{\eta} - [1 - \exp(i\phi_0)] \sum_{j=1}^{n-1} (-1)^j \alpha_j^2 \frac{2J_1(a_j\eta)}{a_j\eta}, \quad (5)$$

where $\alpha_i = R_i/R$, $i=0, \ldots, N$ and where $\eta = 2\pi R\rho/\lambda z$ is a normalized a dimensional coordinate at the image plane with transverse coordinate $\rho$ located at the axial coordinate z, and the incident radiation has wavelength $\lambda$, assumed uniform across the aperture, and $J_1$ is the first-order Bessel function.

9. The device according to claim 7 wherein the zones are radially or linearly symmetric.

10. The device according to claim 7 wherein said transmittance is provided by zones having a height over said spaces expressible as $$h = \frac{\lambda \phi_0}{2\pi(n-1)} \quad (6)$$

where the minimum phase transmittance is given by $\Phi_1$ and the maximum phase transmittance is given by $\Phi_2$, The net phase shift experienced by the incident beam of light is given by $\Phi_0 = \Phi_2 - \Phi_1$.

11. The device according to claim 7 wherein said zones each have a gradient index of refraction.

12. The device of claim 11 where said zones extend into said substrate from a surface thereof and have thickness expressible as $$\varepsilon = \frac{\lambda \phi_0}{2\pi(n_0 - n)}. \quad (7)$$

13. A superresolution device comprising a plurality of zones seperated by spaces in a transmissive substrate where each zone has a phase transmittance which is different from zone to zone.

14. The device of claim 13 wherein said zones define a normalized diffracted field $$\Psi(\eta) = \sum_{j=1}^{n} e^{i\Phi_j} \left[ \alpha_j^2 \frac{2J_1(a_j\eta)}{\alpha_j\eta} - \alpha_{i-1}^2 \frac{2J_1(a_{j-1}\eta)}{\alpha_{j-1}\eta} \right], . \quad (6)$$

15. The device of claim 13 wherein there are a plurality of said zones one of which has a height over said substrate $h_2$ and the other has a height $h_4$ where $$h_2 = \frac{\lambda \phi_2}{2\pi(n-1)} \quad (9)$$

$$h_4 = \frac{\lambda \phi_4}{2\pi(n-1)}. \quad (10)$$

16. The device of claim 13 wherein said zones have different gradient indices of refraction.

17. The device of claim 14 wherein a plurality of said zones is provided extending into a surface of said substrate different distances different thicknesses $E_2$ and $E_4$ which have said gradient indices where $$\varepsilon_2 = \frac{\lambda \phi_2}{2\pi(n_1 - n)} \quad (11)$$

$$\varepsilon_4 = \frac{\lambda \phi_4}{2\pi(n_2 - n)}. \quad (12)$$

18. A superresolution device comprising a plurality of zones separated by spaces in a substrate where each zone has a phase transmittance which varies continuously across the zone.

19. The device of claim 18 where the phase transmittance defines a normalized diffracted field expressible as $$\psi(\eta) = 2 \int_0^1 e^{i\phi(r)} J_0(\eta r) r d r, \quad (13)$$

where $\Phi$ defines the phase function that characterizes the device, r is the radial coordinate at the plane of the device, and $J_0$ is the Bessel function of order zero.

20. The device of claim 18 where at least two of said zones are provided and said device has a phase function as follows:

$$\phi(\alpha) = \begin{vmatrix} 0, & \text{if } 0 \le \alpha < \alpha_1 \\ \frac{\phi_0}{\left[\frac{1}{2}(1-\alpha_1)\right]^{2P_0}} \left| \alpha - \frac{1}{2}(1+\alpha_1) \right|^{2P_0} + \phi_0, & \alpha_1 \le \alpha \le 1, \end{vmatrix} \quad (14)$$

where $\alpha_1$ denotes the boundary of the first zone and $p_0$ is an appropriate number that enables the control of the shape of the continuous phase function.

21. The device of claim 18 wherein said zones have continuous blaze profiles of different heights $h_2$ and $h_4$ given by $$h_2 = \frac{\lambda \phi_2}{2\pi(n-1)} \quad (15)$$

$$h_4 = \frac{\lambda \phi_4}{2\pi(n-1)}. \quad (16)$$

22. The device of claim 18 where said zones are in said substrate and have continuously varying gradient indices each varying over a different range of indices.

23. A superresolution lens which comprises a symmetric lens and a complementary rotationally symmetric superresolution device having zones presenting a phase function selected from the group consisting of a binary phase transmission, a different phase transmission function from zone to zone and a continuously variable phase transmission function.

24. The lens of claim 23 wherein a said lens has a substrate with surface curvature defining a refractive lens which has rotational symmetric complementary to said diffractive lens and said superresolution device and integrated therewith is a common body.

25. A confocal imaging system characterized by having objective and collector lenses each having a superresolution element integrated therewith.

26. A system for imaging a spot of laser illumination on a substrate via a prism which transmits a beam incident on said substrate and deflects an illumination reflected from said substrate characterized as having an objective lens which focusses said spot and a superresolution mask in the path of said illumination which is incident on said substrate wherein said mask has a phase transmission function selected from the group consisting of a binary phase transmission, a different phase transmission function from zone to zone and a continuously variable phase transmission function.

27. A reprographic system for printing of graphical material by scanning lines on a substrate characterized in that a beam of illumination is transmitted via a cylindrical lens as a line of illumination to a beam deflecting means which scans said lenses via a superresolution mask having a phase function selected from the group consisting of a binary phase transmission, a different phase transmission function from zone to zone and a continuously variable phase transmission function.

28. The system according to claim 27 further characterized in having imaging optics between said deflecting device and said substrate for focussing said line on said substrate said imaging optics including another superresolution mark having a phase function selected from the group consisting of a binary phase transmission, a different phase transmission function from zone to zone and a continuously variable phase transmission function.

* * * * *